United States Patent
Yoshimura

(10) Patent No.: US 11,803,068 B2
(45) Date of Patent: Oct. 31, 2023

(54) THIN POLARIZING LENS

(71) Applicant: DAICEL ABOSHI SANGYO CO., LTD., Himeji (JP)

(72) Inventor: Takashi Yoshimura, Himeji (JP)

(73) Assignee: DAICEL ABOSHI SANGYO CO., LTD., Himeji (JP)

(*) Notice: Subject to any disclaimer, the term of this patent is extended or adjusted under 35 U.S.C. 154(b) by 134 days.

(21) Appl. No.: 17/413,055

(22) PCT Filed: Dec. 11, 2019

(86) PCT No.: PCT/JP2019/048464
§ 371 (c)(1),
(2) Date: Jun. 11, 2021

(87) PCT Pub. No.: WO2020/122115
PCT Pub. Date: Jun. 18, 2020

(65) Prior Publication Data
US 2022/0043282 A1 Feb. 10, 2022

(30) Foreign Application Priority Data

Dec. 12, 2018 (JP) .................................. 2018-232942
Jul. 29, 2019 (JP) .................................. 2019-139041

(51) Int. Cl.
*G02C 7/12* (2006.01)
*G02B 1/02* (2006.01)
(Continued)

(52) U.S. Cl.
CPC ................ *G02C 7/12* (2013.01); *B29C 45/14* (2013.01); *B29D 11/00644* (2013.01);
(Continued)

(58) Field of Classification Search
CPC .................................... G02C 1/02; G02C 7/12
(Continued)

(56) References Cited

U.S. PATENT DOCUMENTS 450,177 A * 4/1891 Missimer ................. G02C 1/02
351/110
527,275 A * 10/1894 Fox .......................... G02C 5/02
351/65
(Continued)

FOREIGN PATENT DOCUMENTS

JP 61-235113 A 10/1986
JP 2-501093 A 4/1990
(Continued)

OTHER PUBLICATIONS

International Search Report dated Mar. 10, 2020, in PCT/JP2019/048464.
(Continued)

*Primary Examiner* — Zachary W Wilkes
(74) *Attorney, Agent, or Firm* — Birch, Stewart, Kolasch & Birch, LLP

(57) ABSTRACT

An object of the present invention is to provide a thin and lightweight polarizing lens for use in lightweight sunglasses (in particular, rimless sunglasses) while maintaining the clamping force and mechanical strength of a temple part, and a manufacturing method therefor. The values of: the center thickness v of a polarizing lens A including an injection-molded layer 3 laminated on at least one surface of a polarizing sheet B, the injection-molded layer having a polyamide-based resin; and the flexural modulus of the injection-molded layer 3 are adjusted, thus the predetermined clamping force and mechanical strength of a temple part are obtained even in the case of sunglasses with the thin and lightweight polarizing lens.

11 Claims, 4 Drawing Sheets

(51) Int. Cl.
   *G02B 1/14*      (2015.01)
   *B29C 45/14*     (2006.01)
   *B29D 11/00*     (2006.01)
   *G02B 5/30*      (2006.01)
   *B29K 77/00*     (2006.01)
   *G02C 1/02*      (2006.01)

(52) U.S. Cl.
   CPC .......... *B29D 11/00865* (2013.01); *G02B 1/02* (2013.01); *G02B 1/14* (2015.01); *G02B 5/3041* (2013.01); *B29K 2077/00* (2013.01); *G02C 1/02* (2013.01)

(58) Field of Classification Search
   USPC ..................................... 351/103, 110, 159.56
   See application file for complete search history.

(56) References Cited

U.S. PATENT DOCUMENTS

| | | | | |
|---|---|---|---|---|
| 4,550,989 | A * | 11/1985 | Hafner | G02C 1/08 351/103 |
| 4,838,673 | A | 6/1989 | Richards et al. | |
| 5,702,813 | A | 12/1997 | Murata et al. | |
| 5,835,183 | A * | 11/1998 | Murai | G02C 1/02 351/110 |
| 5,997,139 | A | 12/1999 | Yasuda | |
| 8,192,016 | B2 * | 6/2012 | Siu | G02C 1/08 351/110 |
| 8,703,296 | B2 | 4/2014 | Fujinaka et al. | |
| 10,836,127 | B2 * | 11/2020 | Oya | G02C 7/12 |
| 2007/0148482 | A1 | 6/2007 | Fujinaka et al. | |
| 2009/0305049 | A1 * | 12/2009 | Kobuchi | G02B 5/3033 428/476.3 |
| 2011/0043902 | A1 | 2/2011 | Ishibashi et al. | |
| 2020/0284961 | A1 * | 9/2020 | Fujinaka | G02B 1/041 |

FOREIGN PATENT DOCUMENTS

| | | | |
|---|---|---|---|
| JP | 8-52817 A | 2/1996 | |
| JP | 2000-33621 A1 | 2/2000 | |
| JP | 2000-171761 A | 6/2000 | |
| JP | 2002-90529 A | 3/2002 | |
| JP | 2002-189199 A | 7/2002 | |
| JP | 2007-178920 A | 7/2007 | |
| JP | 2007-240907 A | 9/2007 | |
| JP | 2009-139921 A | 6/2009 | |
| JP | 2009-294445 A | 12/2009 | |
| WO | WO-2018062187 A1 * | 4/2018 | .............. G02C 7/12 |
| WO | WO-2019049835 A1 * | 3/2019 | .............. G02C 7/12 |

OTHER PUBLICATIONS

Written Opinion dated Mar. 10, 2021, in PCT/JP2019/048464.
Decision to Grant a Patent (including an English translation thereof) issued in the corresponding Japanese Patent Application No. 2019-139041 dated Nov. 9, 2021.
Notice of Reasons for Refusal (including an English translation thereof) issued in the corresponding Japanese Patent Application No. 2019-139041 dated Sep. 14, 2021.
Extended European Search Report dated Dec. 1, 2021, in European Patent Application No. 19895630.2.

* cited by examiner

THIN POLARIZING LENS

TECHNICAL FIELD

The present invention relates to a polarizing lens for use in sunglasses and the like. More particularly, the invention relates to a polarizing lens that has an injection-molded layer laminated on at least one surface of a polarizing sheet. The present application claims the rights of priority of JP 2018-232942 filed in Japan on Dec. 12, 2018, and of JP 2019-139041 filed in Japan on Jul. 29, 2019, the content of which is incorporated herein.

BACKGROUND ART

A polarizing lens is a lens in which a lens and a polarizing film are integrated, and has an effect of reducing bright reflected light and glare from road surfaces, water surfaces, snow surfaces, glass, and the like. Thus, such a lens is used as a sunglass lens for use in outdoors such as climbing, fishing, and sports, car driving, and the like. In recent years, reduction in weight has been attempted for improvements in functionality of sunglasses. For example, lightweight sunglasses of 10 g or less in total mass (hereinafter referred to as total weight) are in demand in the market.

Patent Document 1 discloses a polarizing lens for sunglasses, produced by bending a laminated plate that has a supporting layer of polycarbonate laminated on both sides of a polarizing film. Patent Document 2 discloses a method for manufacturing a polarizing lens, in which, with a polarizing film sandwiched between two divided molds, and a resin monomer is filled between the molds and subjected to polymerization and curing. Patent Document 3 discloses a polarizing glass lens produced by sandwiching a polarizing film between glass lenses on both sides of the polarizing film. Patent Document 4 discloses a polarizing lens that has a polycarbonate-based resin, which is injection-molded on one side of a polarizing sheet, the polarizing sheet being formed by sandwiching a polarizing film between protective layers made of a polycarbonate on both sides of the polarizing film.

Patent Document 1 has, because a flat-plate polarizing sheet is subjected to punching and then bent into a lens shape on heating, a problem of variation in optical properties such as spherical power (S: spherical power), cylindrical power (C: cylindrical power), and prismatic power (prismatic power) determined in accordance with the sunglasses standards (ISO12312-1), and such variation may lead to failure in stable production of a polarizing lens that meets the standard, in particular, in a case of thin polarizing lenses. An attempt to reduce the thickness of the polarizing lens manufactured by the method in Patent Document 2 has led to problems such as decrease in the strength, monomer resin as a raw material being expensive and low efficiency in the manufacturing and increase in cost due to the need for high-temperature and long-time polymerization and curing. The glass lens for use in Patent Document 3 has a high specific gravity (2.54 g/cm$^3$ or greater), thereby making it difficult to produce a lightweight polarizing lens. The polycarbonate used in Patent Document 4 has a relatively high specific gravity (1.2 g/cm$^3$), and thus, for producing a lightweight sunglass, for example, of 10 g or smaller in total weight including a frame, there is a need to reduce the thickness of lens center part to approximately 1.2 mm. However, there is a problem of cracking when a hole is made directly in the polycarbonate polarizing lens for processing into sunglasses without a frame, and this tendency becomes significant in a case where the lens thickness is reduced. As described above, techniques for efficiently reducing the thickness and weight of a polarizing lens have not been established currently.

In contrast, rimless sunglasses (two-point sunglasses) are typically composed of a bridge that connects a pair of lenses, a pair of end pieces attached near the respective outer sides of the lenses, and a pair of temples attached to the respective end pieces with a pair of hinges provided therebetween, without any frame (rim) covering the outer edges of the lenses. For this reason, with the rimless sunglasses, the weight can be further reduced.

Now, sunglasses are often used in scenes like sports and outdoors, and there is thus a need to sufficiently increase the clamping force at the temples from both sides for preventing the glasses from falling off from the face. Because the lenses of the rimless sunglasses are not surrounded by any rim, the clamping force at the temples is exclusively resulted from stress due to bending of the lens and temple. The reduced thicknesses of the lenses for reduction in weight, however, leads to a problem that the lenses will be bent and then absorb stress to weaken the clamping force, thereby making the sunglasses more easily falling from the face. In contrast, increasing the thicknesses of the lenses to induce a sufficient clamping force makes the lenses themselves heavier, thereby making it difficult to produce lightweight sunglasses.

In addition, the lenses of the rimless sunglasses are not surrounded by any rim, thus the load applied to the lens and the frame (bridge, temples, and the like) may be increased. In particular, in a case where a force is applied in the direction to spread the temples apart, the stress is likely to disadvantageously concentrate on lenses, the bridge, the temples, or the joints thereof and may lead to breakage of these parts. Accordingly, the lenses, bridge, temples, connections thereof, and the like constituting the rimless sunglasses require mechanical strength that prevents the breakage, but the enhancing strength makes the sunglasses heavier, thereby making it difficult to produce lightweight sunglasses.

Patent Document 5 discloses a polarizing lens that has a polyamide resin molding layer laminated on a polarizing sheet composed of a polarizing film and a polyamide sheet layer, but does not disclose the thickness of the lens specifically. Also, Patent Document 5 does not provide any description on the total weight of rimless sunglasses and on the clamping force and mechanical strength of the temple part.

CITATION LIST

Patent Document

Patent Document 1: JP 2000-171761 A
Patent Document 2: JP S61-235113 A
Patent Document 3: JP H02-501093 A
Patent Document 4: JP H08-52817 A
Patent Document 5: JP 2007-178920 A

SUMMARY OF INVENTION

Technical Problem

Thus, an object of the present invention is to provide a thin and lightweight polarizing lens for producing lightweight sunglasses (in particular, rimless sunglasses) while maintaining the sufficient clamping force and mechanical strength of a temple part.

In addition, another object of the present invention is to provide a method for efficiently manufacturing a thin and lightweight polarizing lens for lightweight sunglasses (in particular, rimless sunglasses) while maintaining the clamping force and mechanical strength of a temple.

Solution to Problem

As a result of diligent research to solve the problems mentioned above, the present inventor has found that, for a polarizing lens including an injection-molded layer laminated on at least one surface of a polarizing sheet, with adjustment in the thickness of a center part of a polarizing lens and the flexural modulus of the injection-molded layer in specific ranges, sunglasses having sufficient clamping force and mechanical strength at a temple part even with a reduced polarizing lens thickness can be produced. And thus, for example, sunglasses, in particular, rimless sunglasses of 10 g or smaller in total weight can be produced. The present invention has completed based on these findings.

More specifically, the present invention provides a polarizing lens including an injection-molded layer laminated on at least one surface of a polarizing sheet, the injection-molded layer having a polyamide-based resin, wherein the polarizing lens has a center thickness from 1.35 to 1.55 mm, and the injection-molded layer has flexural modulus from 1500 to 1800 MPa.

In the polarizing lens, the polarizing sheet may be a laminated sheet with a protective film layer laminated on at least one surface of a polarizing film, and the injection-molded layer may be laminated on the protective film layer.

In the polarizing lens, the polarizing sheet may be a laminated sheet with the protective film layer laminated on both surfaces of the polarizing film.

In the polarizing lens, the protective film layer may include at least one type of resin selected from the group consisting of a polyamide-based resin, a polycarbonate-based resin, and an acyl cellulose.

The polarizing lens may be a decentered lens.

In the polarizing lens, the polyamide-based resin included in the injection-molded layer may contain an alicyclic polyamide.

In the polarizing lens, the polyamide-based resin included in the protective film layer may contain an alicyclic polyamide.

In the polarizing lens, at least one surface of the polarizing lens may be subjected to at least one processing treatment selected from the group consisting of a hard coating treatment, an antireflection treatment, an anti-fogging treatment, an anti-smudge treatment, and a mirror treatment.

The polarizing lens preferably exhibits an impact resistance of 250 g or greater as defined below.

Impact Resistance: the impact resistance is defined as a maximum value of weight (g) of steel ball that does not damage the lens when the steel ball is dropped onto the lens surface from a height of 127 cm.

The polarizing lens may be a lens for sunglasses.

In addition, the present invention provides sunglasses including the polarizing lens.

The polarizing lens may be a lens for rimless sunglasses.

In addition, the present invention provides rimless sunglasses including the polarizing lens.

In addition, the present invention provides a method for manufacturing the polarizing lens, in which the method includes performing thermal fusion bonding of a polyamide-based resin or a composition thereof by injection molding onto at least one surface of a polarizing sheet.

In the method for manufacturing the polarizing lens, the polarizing sheet may be a polarizing sheet with a protective film layer laminated on at least one surface of a polarizing film, and the method includes performing thermal fusion bonding of the polyamide-based resin or a composition thereof by injection molding onto the protective film layer.

In addition, the present invention provides a method for manufacturing rimless sunglasses including a polarizing lens with an injection-molded layer laminated on at least one surface of a polarizing sheet, the method including:

adjusting the center thickness of the polarizing lens and the flexural modulus of the injection-molded layer; and then obtaining rimless sunglasses that have a clamping force adjusted to a predetermined value when a distance between ends of temple parts are expanded to 130 mm.

In the method for manufacturing rimless sunglasses, the injection-molded layer may include a polyamide-based resin.

In the method for manufacturing rimless sunglasses, the polarizing lens preferably has a center thickness adjusted to be from 1.35 to 1.55 mm.

In the method for manufacturing rimless sunglasses, the injection-molded layer preferably has flexural modulus adjusted to from 1500 to 1800 MPa.

In the method for manufacturing rimless sunglasses, the temple part preferably has a clamping force adjusted to 14 g or greater (equivalent to 137.3 mN or greater).

In the method for manufacturing rimless sunglasses, the polarizing sheet may be a laminated sheet with a protective film layer laminated on at least one surface of a polarizing film, and the injection-molded layer may be laminated on the protective film layer.

In the method for manufacturing rimless sunglasses, the polarizing sheet may be a laminated sheet with a protective film layer laminated on both sides of the polarizing film.

In the method for manufacturing rimless sunglasses, the protective film layer may include at least one type of resin selected from the group consisting of a polyamide-based resin, a polycarbonate-based resin, and an acyl cellulose.

In the method for manufacturing rimless sunglasses, the polarizing lens may be a decentered lens.

In the method for manufacturing rimless sunglasses, the polyamide-based resin included in the injection-molded layer may contain an alicyclic polyamide.

In the method for manufacturing rimless sunglasses, the polyamide-based resin included in the protective film layer may contain an alicyclic polyamide.

In the method for manufacturing rimless sunglasses, at least one surface of the polarizing lens may be subjected to at least one processing treatment selected from the group consisting of a hard coating treatment, an antireflection treatment, an anti-fogging treatment, an anti-smudge treatment, and a mirror treatment.

In the method for manufacturing rimless sunglasses, the polarizing lens preferably exhibits an impact resistance of 250 g or greater as defined below.

Impact Resistance: the impact resistance is defined as a maximum value of weight (g) of steel ball that does not damage the lens when the steel ball is dropped onto the lens surface from a height of 127 cm.

Advantageous Effects of Invention

With the polarizing lens according to the present invention, adjusting flexural modulus of the injection-molded layer of the polarizing lens in accordance with the center thickness of the polarizing lens can impart a clamping force at the temple part sufficient for preventing glasses falling from the face, in particular, in a case where the polarizing lens is used for rimless sunglasses and even when the glasses are reduced in their weight.

In addition, even if an external force is applied to rimless sunglasses including the polarizing lens according to the present invention, the lens itself can be bent appropriately to absorb the external force. For example, even if external forces are repeatedly applied to the sunglasses including the polarizing lens according to the present invention in the direction to cause the temples spread apart from each other, the lens itself, the frame such as the temples and bridges, and the connections thereof are less likely to be damaged.

Accordingly, the polarizing lens according to the present invention is suitable as a polarizing lens for lightweight sunglasses, in particular, rimless sunglasses, while the polarizing lens may provide sufficient clamping force and mechanical strength at the temple part.

DESCRIPTION OF EMBODIMENTS

Polarizing Lens

Figure 1:
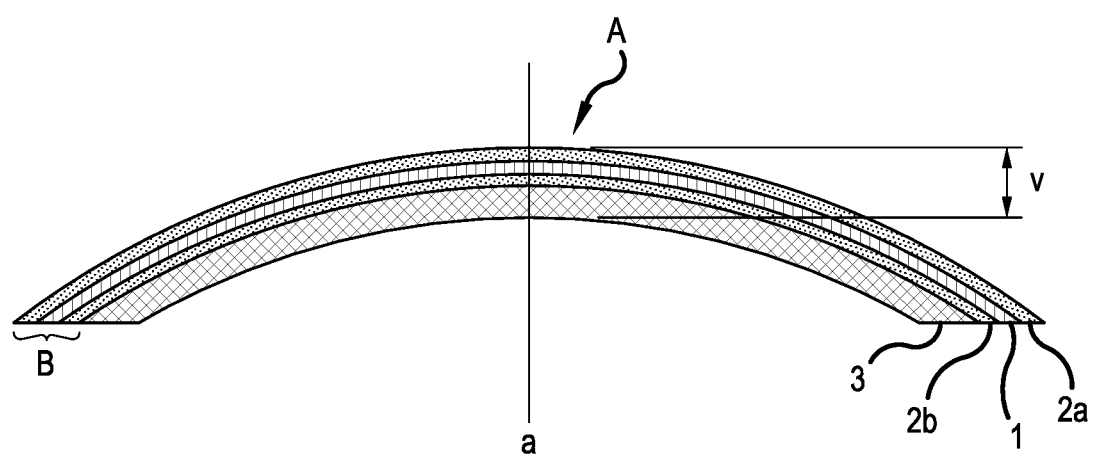
FIG. 1 is a schematic cross-sectional view illustrating an example of a polarizing lens according to an embodiment of the present invention.

The polarizing lens according to an embodiment of the invention is a polarizing lens that has the features mentioned above.

In addition, the polyamide-based resin is relatively low in density (1.0 g/cm$^3$), and thus further capable of contributing to a reduction in weight. Furthermore, the polyamide-based resin also has advantages such as excellent drilling performance (chip-proofness), chemical resistance (e.g., alcohol resistance, DEP (diethyl phthalate) resistance), and other optical properties (low color aberration, high Abbe number, and the like).

[Polyamide-Based Resin]

Examples of the polyamide-based resin for the injection-molded layer of the polarizing lens according to the present invention include aliphatic polyamide-based resins (aliphatic polyamide), alicyclic polyamide-based resins (alicyclic polyamide), and aromatic polyamide-based resins (aromatic polyamide). The polyamide-based resin may be a homopolyamide or a copolyamide.

Examples of the aliphatic polyamides include homopolyamides, for example, condensation products of an aliphatic diamine component (such as a $C_{4-14}$ alkylene diamine including tetramethylene diamine, hexamethylene diamine, or dodecanediamine) and an aliphatic dicarboxylic acid component (such as $C_{6-14}$ alkanedicarboxylic acid including adipic acid, sebacic acid, or dodecanedioic acid) (e.g. polyamide 46, polyamide 66, polyamide 610, polyamide 612, polyamide 1010), homopolyamides of a lactam (such as lactam having about from 4 to 16 carbons including ε-caprolactam or ω-laurolactam) or an aminocarboxylic acid (such as an aminocarboxylic acid having about from 4 to 16 carbons including F-aminoundecanoic acid) (e.g. polyamide 6, polyamide 11, polyamide 12); copolyamides, for example, copolyamides obtained by copolymerization of a monomer component capable of forming a polyamide such as the aliphatic diamine component, aliphatic dicarboxylic acid component, lactam, or aminocarboxylic acid, copolymers of 6-aminocaproic acid and 12-aminododecanoic acid; copolymers of 6-aminocaproic acid, 12-aminododecanoic acid, hexamethylene diamine, and adipic acid; polyamide 6/11, polyamide 6/12, polyamide 66/11, and polyamide 66/12.

Examples of the alicyclic polyamides include homo- or copolyamides having at least one type selected from alicyclic diamines and alicyclic dicarboxylic acids as the constituting component. Examples of the alicyclic diamine include diamino $C_{5-10}$ cycloalkanes such as diaminocyclohexane; bis(amino $C_{5-10}$ cycloalkyl)$C_{1-6}$ alkanes such as bis(4-aminocyclohexyl)methane, bis(4-amino-3-methylcyclohexyl)methane, and 2,2-bis(4'-aminocyclohexyl)propane. The alicyclic diamine may include substituents, for example, a $C_{1-6}$ alkyl group such as a methyl group and an ethyl group, preferably a $C_{1-4}$ alkyl group, more preferably a $C_{1-2}$ alkyl group. In addition, examples of the alicyclic dicarboxylic acid include $C_{5-10}$ cycloalkane-dicarboxylic acids such as cyclohexane-1,4-dicarboxylic acid and cyclohexane-1,3-dicarboxylic acid.

The alicyclic polyamide may be a resin having, as the diamine component and the dicarboxylic acid component, an aliphatic diamine (a $C_{4-14}$ alkylene diamine such as tetramethylene diamine, hexamethylene diamine, and dodecanediamine) and/or an aliphatic dicarboxylic acid (a $C_{4-8}$ alkanedicarboxylic acids such as adipic acid, sebacic acid, and dodecanedioic acid), in addition to the alicyclic diamines and/or alicyclic dicarboxylic acids.

Preferred alicyclic polyamides include, for example, resins (homo- or copolyamides) having, as the constituting components, an alicyclic diamine [for example, bis (amino $C_{5-10}$ cycloalkyl)$C_{1-6}$ alkanes, preferably bis(amino $C_{6-8}$ cycloalkyl)$C_{1-6}$ alkanes, more preferably bis(aminocyclohexyl)$C_{1-3}$ alkanes], and an aliphatic dicarboxylic acid (for example, $C_{4-18}$ alkanedicarboxylic acids, preferably $C_{6-16}$ alkanedicarboxylic acids, even more preferably $C_{8-14}$ alkanedicarboxylic acids). Typical alicyclic polyamide-based resins (the alicyclic polyamide-based resins containing the alicyclic diamine and the aliphatic dicarboxylic acid as the constituting components) include alicyclic polyamide resins represented by Formula (7) below.

[Chem. 1]

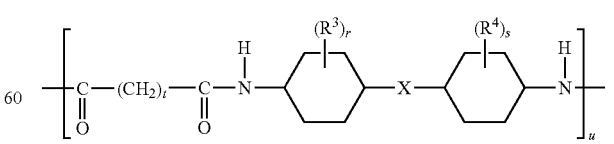

(7)

where X represents a direct bond, an alkylene group, or an alkenylene group; $R^3$ and $R^4$ represent the same or different alkyl groups; r and s represent integers of 0 or from 1 to 4; t and u represent integers 1 or greater.

In Formula (7), the alkylene group represented by the group X (or an alkylidene group) is exemplified by $C_{1-6}$ alkylene groups (or alkylidene groups) such as methylene, ethylene, ethylidene, propylene, propane-1,3-diyl, 2-propylidene, and butylene, preferably $C_{1-4}$ alkylene groups (or alkylidene groups), more preferably $C_{1-3}$ alkylene groups (or alkylidene groups). Furthermore, examples of the alkenylene group represented by the group X include $C_{2-6}$ alkenylene groups such as vinylene and propylene, preferably $C_{2-4}$ alkenylene groups.

For the substituents $R^3$ and $R^4$, the alkyl groups include, for example, $C_{1-6}$ alkyl groups such as methyl, ethyl, propyl, isopropyl, and butyl groups, preferably $C_{1-4}$ alkyl groups, more preferably $C_{1-2}$ alkyl groups (methyl groups, ethyl groups, and the like).

The numbers of these substituents $R^3$ and $R^4$, r and s, can be selected from integers of 0 or from 1 to 4, but may usually be an integer of 0 or 1 to 3, preferably an integer of 0 or from 1 to 2, more preferably 0 or 1. The substituted positions of the substituents $R^3$ and $R^4$ may also be selected from the 2-, 3-, 5-, 6-position relative to the amido group, preferably the 2-, or 6-position.

In Formula (7), t may be, for example, 4 or greater (for example, about from 4 to 30), preferably 6 or more (for example, about from 6 to 20), more preferably 8 or greater (for example, about 8 to 15). Furthermore, in Formula (7), u (a degree of polymerization) may be, for example, 5 or greater (for example, about from 10 to 1000), preferably 10 or greater (for example, about from 30 to 800), more preferably 50 or greater (for example, about from 100 to 500).

Such alicyclic polyamides are highly transparent and are also known as transparent polyamides. The alicyclic polyamide-based resins as described above are available, for example, from Daicel-Evonik Ltd. as "TROGAMID", or from EMS Ltd. as "grille amide (Grilamid)". The alicyclic polyamide-based resins may be used alone or in combination of two or more types.

Examples of the aromatic polyamides include polyamides in which at least one component of the diamine component (for example, an aliphatic diamine such as a $C_{4-14}$ alkylenediamine including tetramethylene diamine, hexamethylene diamine, and dodecandiamine) and the dicarboxylic acid component (for example, an aliphatic dicarboxylic acid such as a $C_{4-14}$ alkane dicarboxylic acid including adipic acid, sebacic acid, and dodecanedioic acid) is an aromatic component, for example, polyamides in which the diamine component is an aromatic component [a condensate of an aromatic diamine such as MXD-6 (metaxylylene diamine, or the like) and an aliphatic dicarboxylic acid], and polyamides in which the dicarboxylic acid component is an aromatic component [a condensate of an aliphatic diamine (trimethylhexamethylenediamine, or the like) and an aromatic dicarboxylic acid (terephthalic acid, isophthalic acid, or the like)].

As the polyamide-based resin, a homopolyamide or copolyamide including a dimer acid as a dicarboxylic acid component, a polyamide into which a branched chain structure is introduced using a small amount of a polyfunctional polyamine and/or a polycarboxylic acid component, or a modified polyamide (N-alkoxymethyl polyamide) may be used. Furthermore, in some applications, the polyamide-based resin may be a thermoplastic elastomer.

These polyamide-based resins may be used alone or in a combination of two or more types.

For facilitating the adjustment of the flexural modulus of the injection-molded layer according to the present invention to the predetermined range in this application, the injection-molded layer according to the present invention preferably includes an alicyclic polyamide-based resin, and more preferably includes an alicyclic polyamide represented by Formula (7).

The number average molecular weight of the polyamide-based resin may be, for example, about from 6000 to 300000, preferably about from 10000 to 200000, even more preferably about from 20000 to 200000.

The polyamide-based resin may be non-crystalline or may have crystallinity, so long as the transparency is ensured. In particular, the polyamide-based resin may be a polyamide-based resin having microcrystallinity (e.g., the degree of crystallinity about from 1 to 20%, preferably about from 1 to 10%, more preferably about from 1 to 8%) (e.g., the alicyclic polyamide-based resin such as alicyclic polyamide resins represented by Formula (7) above). The degree of crystallinity can be determined by a commonly used thermal analysis (a differential scanning calorimetry). A heat of fusion can be determined from an endothermic peak area (S) of the polyamide-based resin, from which the degree of crystallinity can be determined. The heat of fusion may be, for example, 30 J/g or smaller (for example, about from 1 to 30 J/g), preferably 20 J/g or smaller (for example, about from 2 to 20 J/g), more preferably 17 J/g or smaller (about from 3 to 17 J/g).

The polyamide-based resin may have a heat melting temperature (or melting point), and the heat melting temperature (Tm) may be, for example, about 100 to 300° C., preferably about 110 to 280° C., even more preferably about 130 to 260° C. In particular, the heat melting temperature (Tm) of the polyamide-based resin having the crystallinity (particularly microcrystallinity) may be, for example, about 150 to 300° C., preferably about 180 to 290° C.

The polyamide-based resin often has a higher Abbe number than those of polycarbonate-based resins. In particular, an injection-molded layer formed from the polyamide-based resin having a high Abbe number can efficiently prevent the generation of rainbow color unevenness. Therefore, the Abbe number of the polyamide-based resin can be selected from a range of 30 or greater (for example, about from 32 to 65), usually 35 or greater (for example, about from 35 to 65), and it may be, for example, 40 or greater (for example, about from 40 to 60), preferably 42 or greater (for example, about from 42 to 58), even more preferably 44 or greater (for example, about from 44 to 55).

The polyamide-based resin may also contain various additives, for example, a stabilizer (a thermal stabilizer, a UV absorber, and an antioxidant), a plasticizer, a lubricant, a filler, a colorant, a flame retardant, an antistatic agent, and the like.

Polarizing Sheet

The polarizing sheet constituting the polarizing lens according to the present invention is not particularly limited, but examples thereof include a laminated sheet that has a protective film layer laminated on at least one surface of a polarizing film. An aspect in which the polarizing sheet according to the present invention is a laminated sheet that has a protective film layer laminated on at least one surface of a polarizing film is explained below, but the present invention is not to be considered limited to this aspect.

The polarizing film is not particularly limited, and examples thereof include polyvinyl alcohol-based polarizing films. The polyvinyl alcohol-based polarizing film is typically constituted by a polyvinyl alcohol-based resin film and a dichroic substance (iodine, dichroic dye, or the like). The polyvinyl alcohol-based resin may be a saponified product of a copolymer of polyvinyl acetate or vinyl acetate and a small amount of a copolymerizable monomer (an unsaturated carboxylic acid, unsaturated sulfonic acid, cationic monomer, or the like), and a derivative from the saponified compound (a formal compound, an acetal compound, or the like). Specific examples of the polyvinyl alcohol-based resin include polyvinyl alcohol, polyvinyl acetal, and polyvinyl butyral. An average degree of polymerization of the polyvinyl alcohol-based resin may be, for example, about from 1000 to 10000, about from 2000 to 7000, and even more preferably about from 3000 to 5000. Furthermore, a degree of saponification of the polyvinyl alcohol-based resin is about 85 mol % or greater, preferably about 90 mol % or greater (for example, from 90 to 100 mol %), even more preferably about 95 mol % or greater (for example, from 98 to 100 mol %).

The polarizing film can be formed by subjecting the polyvinyl alcohol-based resin film to a treatment such as a swelling treatment, dyeing treatment with a dichroic substance, crosslinking treatment, and stretching treatment (uniaxial stretching treatment with a magnification about from 3 to 7). The thickness of the polarizing film may be, for example, about from 5 to 100 μm (for example, from 10 to 80 μm). The surface of the polarizing film may be subjected to various surface treatments (e.g., a corona discharge treatment, plasma treatment, and anchor coating treatment) to improve the adhesion.

Examples of the resin constituting the protective film can include various thermoplastics that can be thermoformed, for example, olefin resins (such as polypropylene and poly(4-methylpentene-1)), styrene-based resins (such as polystyrene, acrylonitrile-styrene copolymers, and styrene-methyl methacrylate copolymers), acrylic resins (such as methyl polymethacrylate and methyl methacrylate-styrene copolymers), polyester-based resins (homo-, copolyester, or aromatic polyester-based resins having alkylene arylate units), polyamide-based resins, polycarbonate-based resins (such as bisphenol-type polycarbonate-based resins, e.g., bisphenol A), thermoplastic polyurethane-based resins, and resins having a crosslinked hydrocarbon ring (such as an adamantane ring, norbornane ring, and cyclopentane ring) (such as trade name "ARTON" from JSR Corporation, trade name "ZEONEX" from Zeon Corporation, and trade name "APEL" from Mitsui Chemicals, Inc.). Further, as the thermoplastic resin, acyl celluloses (for example, a cellulose triacetate, a cellulose diacetate, a cellulose acetate propionate, a cellulose acetate butyrate, and the like) may be used, and the acyl celluloses may be plasticized with a plasticizer, or may be internally plasticized acyl celluloses such as a cellulose acetate propionate and cellulose acetate butyrate. The protective film may include one of these resins, or may include two or more thereof.

The resin constituting the protective film is preferably an optically isotropic resin and a transparent resin. Furthermore, the resin is preferably a resin with small birefringence. In addition, resins that have high impact resistance are also preferred. Examples of the resin with these properties can include the polyamide-based resins, polycarbonate-based resins, thermoplastic polyurethane-based resins, and acyl celluloses exemplified above, and the polyamide-based resins (in particular, alicyclic polyamides), the polycarbonate-based resins, and the acyl celluloses (in particular, cellulose triacetate) are preferred. Furthermore, the resin constituting the protective film is particularly preferably a resin belongs to the same kind as or the same resin as the resin constituting the injection-molded layer (for example, a polyamide-based resin such as the illustrated alicyclic polyamide).

In a case where the injection-molded layer and protective film in the polarizing lens according to the present invention are both composed of a polyamide-based resin, then the main components of the protective film layer and injection-molded layer are both composed of the polyamide-based resin, and it is thus not necessary to provide a separate adhesive layer or the like, and the protective film layer and injection-molded layer that have a favorable affinity to each other can be subjected to fusion bonding directly. For this reason, the manufacturing process can be shortened, thus allowing efficient manufacture at low cost. The optical function will not be impaired because no adhesive layer is provided separately. Furthermore, due to integration of the protective film layer and the injection-molded layer with high adhesion therebetween, an excellent optical function can be imparted.

The method of forming the protective film is not particularly limited, and can be usually performed by a melt extrusion method, a solution casting method, or the like, using the thermoplastic resin described above (preferably a polyamide-based resin). In the melt extrusion method, for example, the thermoplastic resin may be melted and mixed in an extruder or the like, extruded from a die (for example, a T die), and cooled to produce the protective film. In terms of the productivity of the protective film, the melt-extrusion method is preferable. The resin temperature during melting and forming (melt forming) of the thermoplastic plastic resin can typically be selected from a temperature range of about 120 to 350° C.

The protective film can be composed of an unstretched film, or a uniaxial or biaxial stretched film or the like. In particular, in a case where the protective film is composed of a stretched film (in particular, a uniaxial stretched film), the problem of occurrence of white spots [or cross-shaped white spots, cross-shaped white clouding] in the polarizing sheet after bending is resolved. Thus, a polarizing lens can be produced while occurrence of white spots is either prevented or suppressed.

The stretching is carried out by a roll method, a tenter method, a tube method, or similar methods. The stretching temperature is, for example, approximately from 80 to 250° C., preferably approximately from 110 to 250° C., and more preferably approximately from 120 to 200° C. The stretch ratio can be adjusted appropriately depending on the type, thickness, and the like of the resin constituting the protective film. The stretch ratio is, for example, from 1.10 to 3.5 times, preferably from 1.15 to 2.8 times, more preferably from 1.18 to 2.5 times in at least one direction [length direction (MD direction) and/or width direction (TD direction)].

In addition, the surface of the protective film may be subjected to various surface treatments (e.g., a corona discharge treatment, plasma treatment, and anchor coating treatment), to improve the adhesion.

The thickness of the protective film is not particularly limited, but is preferably from 50 to 300 μm, more preferably from 100 to 250 μm.

The protective film in the polarizing sheet may usually be laminated to the polarizing film with an adhesive layer provided between the protective film and the polarizing film. More specifically, the polarizing sheet may constitute the polarizing film and the protective film laminated on at least one surface of the polarizing film with an adhesive layer provided between the polarizing film and the protective film.

The adhesive (or tacky adhesive) that forms the adhesive layer is not particularly limited, and examples thereof include commonly used adhesives such as an acrylic adhesive, a urethane-based adhesive, and an epoxy-based adhesive. Any adhesive that sufficiently adheres the polarizing film to the protective film for a polarizing film may be used. The adhesive layer may also contain various additives, a stabilizer (a thermal stabilizer, a UV absorber, and an antioxidant), a plasticizer, a colorant, a flame retardant, an antistatic agent, a viscosity modifier, and the like. The thickness of the adhesive layer can be selected from a range, for example, about from 0.1 to 80 μm, and is usually about from 1 to 60 μm, preferably about from 2 to 50 μm, more preferably about from 5 to 40 μm, in terms of a solid content.

The polarizing sheet with the adhesive layer can be manufactured by laminating the protective film on one or both sides of the polarizing film using the adhesive. In this method, typically, the protective film is often adhered to both sides of the polarizing film. After adhering the polarizing film to the protective film with the adhesive, aging may be performed at an appropriate temperature (for example, about 30 to 70° C.).

Note that, to adjust the coating properties, the adhesive may contain an organic solvent, for example, a hydrocarbon (an aliphatic hydrocarbon such as hexane, an alicyclic hydrocarbon such as cyclohexane, an aromatic hydrocarbon such as toluene), a halogenated hydrocarbon, an ester (such as ethyl acetate), a ketone (such as acetone, methyl ethyl ketone, methyl isobutyl ketone), and an ether (such as dioxane or tetrahydrofuran). The ether may be an alkyleneglycol dialkyl ether such as ethyleneglycol diethyl ether, an alkyleneglycol alkyl ether acetate such as ethyleneglycol monoalkyl ether acetate. These additives may be used alone or in combination of two or more types.

The polarizing sheet may be formed (or formed and processed) by various processes. In particular, for the application of the lens as an optical member such as sunglasses, the polarizing sheet is often produced by a bending process [a curved shape, for example, a convex surface or a spherical surface shape (one surface is convex and the other surface is concave)].

As such, the polarizing sheet may be a polarizing sheet that has a curved shape (or a polarized sheet that has been subjected to bending (bending to a convex shape)).

In the polarizing sheet that has a curved shape, a radius of curvature is not particularly limited and is set appropriately depending on a frame design and the like.

The polarizing sheet that has a curved shape can be formed by laminating the protective film on at least one surface (in particular, both surfaces) of the polarizing film (usually laminating using an adhesive), and bending the films (in particular, bending by thermoforming). The bending process (processing into a curved shape) can typically be performed by thermoforming. The thermoforming method is not particularly limited, and examples thereof include methods such as a forming method for a single curved surface, a forming method for a double curved surface (vacuum forming, free blow molding, pressure forming, and heat pressing). A particularly preferred thermoforming method is vacuum forming. The thermoforming temperature is set appropriately depending on the resin material, but for example, preferably from 90 to 110° C. in a case of a polyamide-based resin. In a case of using a mold, a mold heated to the same degree as the heating temperature for the optical sheet is used.

The total thickness of the polarizing sheet according to the present invention is, for example, approximately from 100 to 700 μm, preferably from 400 to 650 μm. The surface of the polarizing sheet may be subjected to various surface treatments (e.g., a corona discharge treatment, plasma treatment, and anchor coating treatment) to improve the adhesion.

Injection-Molded Layer

The polarizing lens according to the present invention is a polarizing lens produced by laminating an injection-molded layer including a polyamide-based resin on the polarizing sheet. In a case where the polarizing sheet is a laminated sheet with the protective film layer laminated on at least one surface of the polarizing film, the injection-molded layer is preferably laminated on the protective film layer.

In a case of a polarizing sheet with the protective film laminated on both surfaces of the polarizing film, the injection-molded layer may be formed on both surfaces of the polarizing sheet, or may be formed on one surface thereof. In a case of molding or forming the injection-molded layer on one surface of the polarizing sheet, typically, the injection-molded layer is preferably formed on the lens concave side (the side facing an eye of a user) of the polarizing sheet.

Hereinafter, an aspect in which the polarizing sheet is a laminated sheet with the protective film layer laminated on at least one surface of the polarizing film, and the injection-molded layer is laminated on the protective film layer will be described, but the present invention is not to be considered limited to this aspect.

The injection-molded layer can be formed by using a known injection molding method with the use of a mold, and can be formed by, for example, an insert injection molding method, an injection compression molding method, or the like. Insert injection molding can be performed by placing the polarizing sheet (in particular, a polarizing sheet that has a curved shape) at a predetermined position in the mold, and performing injection-molding to the molten polyamide-based resin or composition thereof into a mold. It is to be noted that the resin may be injection-molded onto one surface of the polarizing sheet, or the resin may be injection-molded onto both surfaces thereof. The polarizing sheet with a curved shape (e.g., spherical shape) may be formed by performing injection-molding to a resin on a convex and/or concave surface, but preferably by performing injection-molding to the resin onto the side with the concave surface. The injection molding can be performed with the use of a commonly used method, for example, by injecting a resin melt-kneaded at a temperature of about 200 to 350° C. (preferably 250 to 330° C.), at a pressure of about 50 to 200 MPa, depending on the type of the polyamide-based resin or composition thereof. In addition, the molded article, obtained by injection molding, may be annealed. When the injection compression molding method is used, after the melted resin is injected into the mold, a compressive force can be applied to the resin in the mold. Thus, a polarizing lens with a high dimensional precision can be produced. Furthermore, as compared with the method described in Patent Document 2 above, in which the resin monomer is filled, polymerized and cured, this method can achieve high reproducibility, and reduce the production cost significantly.

The thickness of the injection-molded layer can be appropriately selected to the extent that ease of handling and optical functions, and the like are not impaired, and is, for example, from 650 to 1300 μm.

The polarizing lens according to the present invention is characterized in that the flexural modulus of the injection-molded layer is from 1500 to 1800 MPa. From the perspective of ensuring the clamping force, the flexural modulus of the injection-molded layer is preferably 1550 MPa or greater, more preferably 1600 MPa or greater, even more preferably 1650 MPa or greater. In addition, from the perspective that the polarizing lens according to the present invention can absorb external forces by bending its shape appropriately, the flexural modulus of the injection-molded layer is preferably 1775 MPa or smaller, more preferably 1750 MPa or smaller, even more preferably 1725 MPa or smaller.

The polarizing lens according to the present invention is not particularly limited, but the bending stress (3.5% bending stress) of the injection-molded layer at a specified bending of 3.5% is preferably from 60 to 110 MPa. From the perspective of ensuring the clamping force in the sunglasses according to an embodiment of the present invention, the 3.5% bending stress of the injection-molded layer is preferably 65 MPa or greater, more preferably 70 MPa or greater, even more preferably 75 MPa or greater. In addition, from the perspective that the polarizing lens according to the present invention can absorb external forces by bending its shape appropriately, the 3.5% bending stress of the injection-molded layer is preferably 105 MPa or smaller, more preferably 100 MPa or smaller, even more preferably 95 MPa or smaller.

The polarizing lens according to the present invention is not particularly limited, but the flexural strength of the injection-molded layer is preferably from 100 to 160 MPa. From the perspective of ensuring the clamping force in the sunglasses according to the present invention, the flexural strength of the injection-molded layer is preferably 105 MPa or greater, more preferably 110 MPa or greater, even more preferably 115 MPa or greater. In addition, from the perspective that the polarizing lens according to the present invention can absorb external forces by bending its shape appropriately, the flexural strength of the injection-molded layer is preferably 155 MPa or smaller, more preferably 150 MPa or smaller, even more preferably 145 MPa or smaller.

The polarizing lens according to the present invention is not particularly limited, but the tensile modulus of the injection-molded layer is preferably from 1300 to 1700 MPa. From the perspective of ensuring the clamping force in the sunglasses according to the present invention, the tensile modulus of the injection-molded layer is preferably 1350 MPa or greater, more preferably 1400 MPa or greater, even more preferably 1450 MPa or greater. In addition, from the perspective that the polarizing lens according to the present invention can absorb external forces by stretching its shape appropriately, the tensile modulus of the injection-molded layer is preferably 1650 MPa or smaller, more preferably 1600 MPa or smaller, even more preferably 1550 MPa or smaller.

The polarizing lens according to the present invention is not particularly limited, but the yield strength of the injection-molded layer is preferably from 40 to 80 MPa. From the perspective of ensuring the clamping force in the sunglasses according to the present invention, the yield strength of the injection-molded layer is preferably 45 MPa or greater, more preferably 50 MPa or greater, even more preferably 55 MPa or greater. In addition, from the perspective that the polarizing lens according to the present invention can absorb external forces by bending its shape appropriately without being damaged, the yield strength of the injection-molded layer is preferably 75 MPa or smaller, more preferably 70 MPa or smaller, even more preferably 65 MPa or smaller.

The flexural modulus, bending stress (3.5% bending stress), flexural strength, tensile modulus, yield strength, and the like of the injection-molded layer can be adjusted in the predetermined ranges according to the present invention by adjusting the type and content of the polyamide-based resin constituting the injection-molded layer, the type of the other resin, the additives and amounts thereof, and the injection molding conditions such as melt temperature and pressure.

For the flexural modulus of the injection-molded layer, the polyamide-based resin or composition thereof for use in injection molding is used to prepare a sheet of an injection-molded layer without any polarizing sheet, and the flexural modulus, bending stress (3.5% bending stress), and the flexural strength can be measured respectively by methods in accordance with ISO178, whereas the tensile modulus and the yield strength can be measured respectively by methods in accordance with ISO527.

Polarizing Lens

For the polarizing lens according to the present invention, the injection-molded layer (more preferably, the protective film layer of the polarizing sheet) includes a polyamide-based resin, and the center thickness of the polarizing lens falls within the range from 1.35 to 1.55 mm.

FIG. 1 is a schematic cross-sectional view illustrating an example of a polarizing lens according to an embodiment of the present invention. For a polarizing sheet B constituting a polarizing lens A in FIG. 1, a polarizing film 1 is sandwiched between two protective film layers 2a and 2b with an adhesive layer (not shown) provided therebetween. The two protective film layers 2a, 2b can be formed from the same resin or different types of resins, and may have the same thickness or different thicknesses. The polarizing film 1 of the polarizing sheet B as mentioned above is protected at both sides by the protective film layers 2a and 2b from shocks, contamination, and the like. Thus, degradation of optical performance can be prevented and favorable optical performance can be obtained. An injection-molded layer 3 including a polyamide-based resin is integrally molded onto the protective film layer 2b constituting the polarizing sheet B by thermal fusion bonding.

In FIG. 1, v denotes the center thickness of the polarizing lens A. The center thickness of the polarizing lens according to the present invention is from 1.35 to 1.55 mm, preferably from 1.4 to 1.5 mm, from the perspective of achieving the clamping force and mechanical strength when a polarizing lens is used for rimless sunglasses.

If the center thickness of the polarizing lens according to the present invention is thinner than 1.35 mm, the clamping force will be reduced and the sunglasses may easily fall off from the face. It is to be noted that the clamping force of the rimless sunglasses is mainly generated by the stress of the temple part of the lens. However, in a case where the center thickness of the polarizing lens according to the present invention is thinner than 1.35 mm, the lens is significantly bent and absorbs the stress, making it difficult to induce the stress to achieve a clamping force to the temple part.

In contrast, if the center thickness of the polarizing lens according to the present invention exceeds 1.55 mm, the weight of the lens will also increase, thus making it difficult to reduce the weight of the sunglasses. In addition, the lens itself will be less bent and absorbs less external forces. Thus, lenses and frame (bridge, temples, and the like) of the sunglasses, and the joints thereof are prone to damage.

The center thickness v of the polarizing lens A refers to the thickness of the polarizing lens A at the central axis a in FIG. 1.

In the present invention, the center of the polarizing lens is not particularly limited, but may be, for example, a geometric center.

In addition, the polarizing lens according to the present invention has the configuration mentioned above, thus exhibits sufficient impact resistance, and preferably exhibits impact resistance of 250 g or greater and more preferably exhibits impact resistance of 500 g or greater, in the following impact resistance test.

Impact Resistance Test: The impact resistance is defined as the maximum value of weight (g) of steel ball that does not damage the lens when the steel ball is dropped onto the lens surface from a height of 127 cm.

It is to be noted that the ISO12312-1 standard requires that the lens does not break in a case where a steel ball of 16 g is dropped from a height of 127 cm to the lens surface.

The polarizing lens according to the present invention can be considered to have sufficient strength because the lens does not break even when a steel ball of 250 g or greater, far exceeding 16 g in accordance with the standard, is dropped to the lens surface.

As for the impact resistance, the statement that "the lens does not break", though not particularly limiting, refers to the fact the lens does not break with a probability of, for example, 90% or greater.

Figure 2:
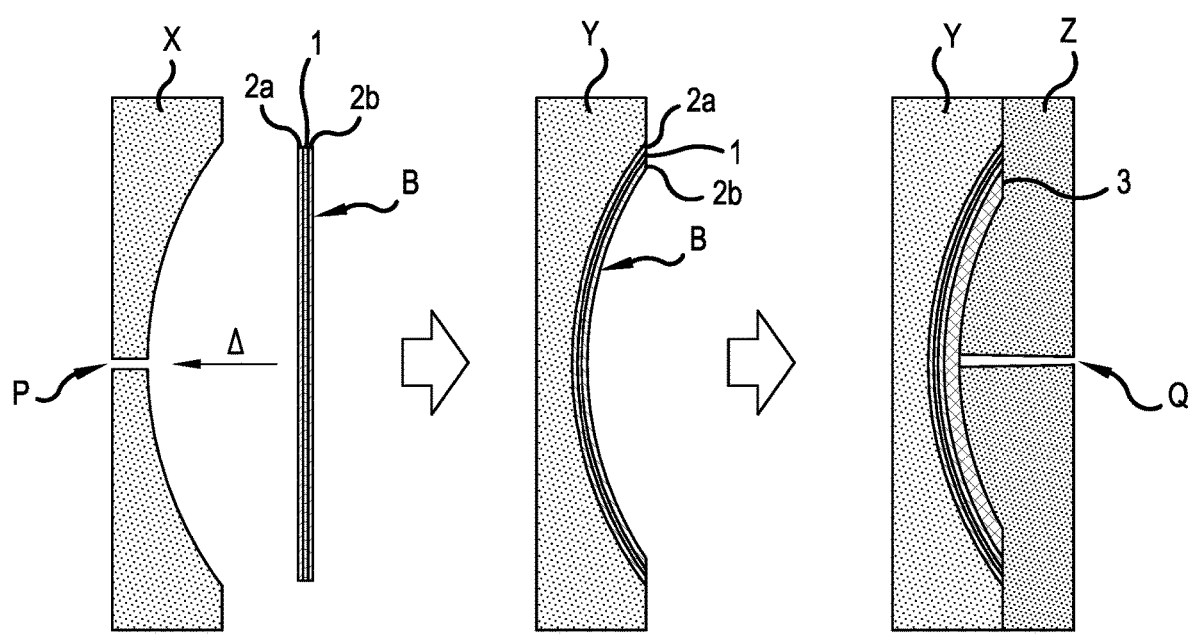
FIG. 2 is a schematic process chart illustrating an example of the manufacturing method of a polarizing lens according to an embodiment of the present invention.

FIG. 2 is a schematic process chart illustrating an example of the manufacturing method of a polarizing lens according to an embodiment of the present invention. FIG. 2 shows a series of steps for producing a polarizing lens. (I) Bending, with the use of a mold X for bending, the polarizing sheet B that has the protective film layers 2a, 2b laminated on both sides of the polarizing film 1 with an adhesive (not shown) provided therebetween; (II) placing the bent polarizing sheet B in a mold Y for injection molding; and (III) performing thermal fusion bonding of a polyamide-based resin composition onto the polarizing sheet B by injection molding with the use of molds Y, Z for injection molding.

The planar polarizing sheet B is subjected to a bending process (I). This bending is performed as follows: heating the planar polarizing sheet B to a temperature (for example, around 100° C.) at which the sheet can be molded, then placing the polarizing sheet B in the mold X for bending, deforming the polarizing sheet B so that the sheet conforms to the concave shape of the mold X, using suction from a suction hole P provided in the mold X, and cooling and hardening the polarizing sheet B. The bending process according to the present invention can be performed by the vacuum molding or known methods such as compression molding, and a vacuum molding method is preferably used.

The injection molding is performed by: (II) placing the polarizing sheet B, which has been subjected to the bending process (I), in the mold Y for injection molding, placing the mold Z thereon, heating and then melting a resin composition constituting the injection-molded layer 3 including a polyamide-based resin, for example, around 280° C., and injecting the resin composition through an injection hole Q provided in the mold Z into a gap in the mold. The polyamide-based resin composition can be subjected to thermal fusion bonding to the protective film layer 2b constituting the polarizing sheet B as described above. Therefore, a favorable molded article can be produced without using an adhesive. In the example of FIG. 2, the injection-molded layer 3 is laminated on a concave side (inner side) of the polarizing sheet B with a curved shape, but not limited thereto, and may be laminated on the convex side (outer side) or the both sides. The injection-molded layer 3 is preferably provided on the concave side (inner side) of the polarizing sheet B. In a related art, injection molding using the polycarbonate-based resin is prone to deformation. Such deformation may cause a problem of color unevenness (such as a rainbow color pattern). In contrast, according to the present invention with the polyamide-based resin composition used, deformation due to injection molding and color unevenness associated with the deformation do not occur, and a polarizing lens with excellent optical properties can be produced. The present invention is advantageous in that, in particular, even when the polarizing sheet B, which has been subjected to the bending process, is used, a polarizing lens that is less likely to have deformation or color unevenness but has excellent optical function can be produced.

With the method according to the present invention, the protective film layer of the polarizing sheet which has been subjected to the bending process and the injection-molded layer including the polyamide-based resin can be stably fused and integrated in a simple manner.

The injection-molded layer of the polarizing lens according to the present invention contains the polyamide-based resin as a main component, and thus is less likely to develop a crack even if a hole is directly made, and exhibits excellent processability and excellent chemical resistance advantageously. When such a polarizing lens is used as a lens for sunglasses and used in combination with other components, the use of the polarizing lens can prevent problems such as degradation caused by contact with chemicals such as plasticizers contained in the other components. As described above, the polarizing lens according to the present invention can be subjected to various processing means, and moreover, because of the excellent chemical resistance, can be used in combination with a material that contains a plasticizer or the like as a constituent.

When the polarizing lens according to the present invention is used as a lens, for example, for sunglasses, the polarizing lens is preferably designed decentered. The lens for sunglasses is a non-correcting lens, which requires having no "optical power" (having no "optical power" refers to producing no refraction). The lens may be provided with an appropriate taper (decentered). Then, the lens can be prevented from having an "optical power".

In a case where the polarizing lens according to the present invention is employed as a decentered lens, a decentered lens mold is used as a mold for use in injection molding. As the decentered lens mold, known molds can be employed without limitation, and for example, the decentered lens mold described in JP 2000-33621 A can be used.

The decentered lens mold described in JP 2000-33621 A is composed of: at least a pair of cores composed of a core with a convex surface and a core with a concave surface; and a ring member provided on an outer periphery of at least any one of the pair of cores, and configured to make the central axes of the convex surface and concave surface relatively decentered. Specifically, in FIG. 2, the polarizing lens according to the present invention can be made decentered by shifting the central axis of the mold Z with the convex surface and the central axis of the mold Y with the concave surface by a predetermined length with the use of a decentered ring. The use of such a mold eliminates the need for preparing multiple expensive cores that require mirror finish, and the use of an inexpensive decentered ring allows a decentered lens to be freely molded at a low cost depending on the degree of decenter.

At least one surface of the polarizing lens according to an embodiment of the present invention may be, as necessary, subjected to various processing treatments, for example, a hard coating treatment, an antireflection treatment, a mirror treatment, an anti-fogging treatment, an anti-smudge treatment, a mirror treatment, or the like, or may be subjected to these multiple processing treatments in combination.

The antireflection treatment can be performed by forming multiple inorganic layers [for example, inorganic oxide layers such as a zirconium oxide (such as $ZrO_2$), a silicon oxide (such as $SiO_2$), an aluminum oxide (such as $Al_2O_3$), and a titanium oxide (such as $TiO_2$)] or organic layers that differ in refractive index from each other with the use of a vapor deposition method, a coating method, or the like.

In addition, the anti-fogging treatment can be performed by coating the surface with a hydrophilic resin, and the anti-smudge treatment can be performed by coating the surface with a substance having a low surface tension (a silicone-based or fluorine-based material). Furthermore, the mirror treatment can be performed by forming a reflective metal film such as aluminum employing a vapor deposition method.

In particular, for the polarizing lens according to the present invention, in a case where the polarizing sheet has a protective film layer laminated on both surfaces of a polarizing film, and an injection-molded layer laminated on one of the protective films, a hard coating layer is preferably laminated on the other protective film.

The hard coating layer in the polarizing lens according to an embodiment of the present invention can be formed by applying a curable composition (hard coating agent) onto at least one surface of the polarizing lens according to the present invention, and then curing the curable composition.

The hard coating agent desirably has excellent flexure resistance in consideration of uses of the thin lens, and for example, a polyorganosilsesquioxane-based hard coating agent can be used. The hard coating agent may include a color material that has the property of absorbing transmitted light in a specific wavelength region (e.g., around 585 nm).

The thickness of the hard coating layer (in a case of the polarizing lens having hard coating layers on the both surfaces, the thickness of each hard coating layer) is not particularly limited, but is preferably from 1 to 20 μm, more preferably from 1.5 to 6.0 μm.

The injection-molded layer of the polarizing lens according to the present invention includes the polyamide-based resin, and the center thickness of the polarizing lens is adjusted in the range from 1.35 to 1.55 mm, and the flexural modulus of the injection-molded layer is adjusted in the range from 1500 to 1800 MPa, and thus, the polarizing lens can be bent to a moderate degree and absorb external forces, and produces an appropriate clamping force. More specifically, the appropriate clamping force that prevents the sunglasses falling from the face is applied to the rimless sunglasses including the polarizing lens according to the present invention, and the lens is bent moderately to absorb the forces even if external forces are repeatedly applied in the direction in which the temples are spread apart from each other, and thus, the lens itself, the frame such as the temples and bridges, and the connections thereof are less likely to be damaged, and also excellent in mechanical strength.

The frame of the rimless sunglasses, which has no rim that covers the outer edge of the lens, is composed of a frame including a bridge that connects the pair of lenses, a pair of end pieces attached near the respective outer sides of the lenses, and a pair of temples attached to each of the end pieces with a pair of hinges provided therebetween. More specifically, because the lenses of the rimless sunglasses have no rim that covers the outer edge, the polarizing lens according to the present invention can be bent to absorb external forces without being affected by the rim and the clamping force of the rimless sunglasses can be ensured.

The clamping force of the rimless sunglasses including the polarizing lens according to the present invention can be measured as a load required to spread the temple ends apart to a distance of 130 mm, when the load is applied to the both temple ends. Such a load is preferably 14 g or greater, more preferably 14.5 g or greater. In a case where the load is less than 14 g, the clamping force of the temple part will be insufficient, and the glasses may easily fall from the face. It is to be noted that 130 mm is the standard distance between the temple ends when the sunglasses are worn on the face.

Furthermore, the polarizing lens according to the present invention is excellent in molding processability and mechanical properties (such as mechanical strength), and even when the lens is subjected to, for example, punching, boring, or the like, the lens can be made without breakage, a crack, or the like. Furthermore, the polyamide-based resin (in particular, an alicyclic polyamide-based resin) has excellent chemical resistance, and does not develop a crack or the like even when the resin is directly brought into contact with, for example, an eyeglass frame made of a cellulose acetate resin including a plasticizer (a diethyl phthalate, or the like). Thus, the polyamide-based resin exhibits excellent durability.

Method for Manufacturing Rimless Sunglasses

In the method for manufacturing the rimless sunglasses according to an embodiment of the present invention, the center thickness of the polarizing lens with the injection-molded layer laminated on at least one surface of the polarizing sheet and the flexural modulus of the injection-molded layer are adjusted such that rimless sunglasses that have a clamping force adjusted to a predetermined value in the case of opening to 130 mm between the ends of the temple part are produced.

In the method for manufacturing the rimless sunglasses according to the present invention, the clamping force is preferably adjusted to 14 g or greater, more preferably adjusted to 14.5 g or greater. In a case where the clamping force is less than 14 g, the clamping force of the temple part will be insufficient, and the glasses may easily fall from the face.

In the method for manufacturing the rimless sunglasses according to the present invention, the center thickness of the polarizing lens is preferably adjusted to from 1.35 to 1.55 mm, more preferably adjusted to from 1.4 to 1.5 mm from the perspective of controlling the clamping force in a predetermined range.

In the method for manufacturing the rimless sunglasses according to the present invention, the flexural modulus of the injection-molded layer is preferably adjusted to from 1500 to 1800 MPa from the perspective of controlling the clamping force in a predetermined range. From the perspective of ensuring the clamping force, the flexural modulus of the injection-molded layer is preferably adjusted to 1550 MPa or greater, more preferably adjusted to 1600 MPa or greater, even more preferably adjusted to 1650 MPa or greater. In addition, from the perspective of allowing the polarizing lens according to the present invention to be bent appropriately to absorb external forces, the flexural modulus of the injection-molded layer is preferably adjusted to 1775 MPa or smaller, more preferably adjusted to 1750 MPa or smaller, even more preferably adjusted to 1725 MPa or smaller.

In the method for manufacturing the rimless sunglasses according to the present invention, the material constituting the injection-molded layer is not particularly limited, but preferably includes a polyamide-based resin. In addition, the polarizing sheet constituting the polarizing lens is not particularly limited, but is preferably a laminated sheet with the protective film layer laminated on at least one surface (preferably) of the polarizing film. In addition, the protective film layer preferably includes at least one type of resin selected from the group consisting of a polyamide-based resin, a polycarbonate-based resin, and an acyl cellulose.

The other structures and materials of the polarizing lens and rimless sunglasses are the same as mentioned above.

EXAMPLES

Hereinafter, the present invention will be described in more detail based on examples, but the present invention is not limited by these examples.

Example 1: Preparation of Polyamide Polarizing Lens (Center Thickness: 1.45 mm)

Preparation of Polarizing Sheet

An alicyclic polyamide resin (TROGAMID CX7323 from Daicel-Evonik Ltd.) was heated and then melted with a φ40-mm single screw extruder, and a sheet with a thickness of 630 μm was extruded through a T die, cooled with a chill roll, and then wound up with a winding machine. Next, the wound sheet was guided to a vertical uniaxial stretching device, and was uniaxially stretched at a stretch ratio of 2.50 while heating to a temperature (approximately from 140 to 160° C.) that is slightly higher than the glass transition temperature of the resin, to produce a polyamide sheet with a thickness of 200 μm. A polyurethane-based adhesive was coated on one side of the produced polyamide sheet to a thickness of 5 μm, and the polyamide sheets were bonded to both sides of a polyvinyl alcohol-based polarizing film with a thickness of about 40 μm, and thus a polyamide polarizing sheet with a total thickness of 450 μm was produced.

Bending of Polarizing Sheet

The polarizing sheet was cut out using a Thomson blade into a predetermined shape (a shape created by making a pair of opposed edges of an approximate quadrilateral to follow an approximately arc-like outer periphery). The cut-out polarizing sheet was placed on a concave bending mold (X) of 87 mm in radius of curvature, adjusted to a temperature of 100° C., and vacuum-suctioned through a suction hole provided in the lower part of the concave mold to produce a polarizing sheet with a predetermined curved shape.

Injection Molding

Next, the polarizing sheet that has been subjected to bending was disposed on the concave surface of an injection molding mold (Y) placed in an injection molding machine. The injection mold (Y) was designed to mold decentered injection molding lenses with 76 φmm and a center thickness of 1.45 mm. After closing with a convex mold (Z), a polyamide resin composition (TROGAMID CX7323 from Daicel-Evonik Ltd.) melted and kneaded to 280° C. was injected at a pressure of 200 MPa to form a thin polarizing lens of 1.45 mm in center thickness.

Hard Coat

Next, for the purpose of improving the scratch resistance of the surface, a hard coating liquid containing polyorganosilsesquioxane was applied to the entire surface of the thin polarizing lens formed by the injection molding, heated in an oven at 100° C. for 4 hours, polymerized, and cured to form a hard coating film on each of the convex and concave surfaces of the lens.

Comparative Example 1: Preparation of Polycarbonate Polarizing Lens (Center Thickness: 2.2 mm)

Preparation of Polarizing Sheet

The polyamide resin in Example 1 was changed to a polycarbonate resin (from Iupilon S-3000 Mitsubishi Engineering-Plastics Corporation), and a polycarbonate polarizing sheet with a total thickness of 550 μm was prepared by the same method as in Example 1.

Bending of Polarizing Sheet

From the polarizing sheet, a polarizing sheet with a predetermined curved shape was prepared by the same method as in Example 1.

Injection Molding

Next, the polarizing sheet that has been subjected to bending was disposed on the concave surface of an injection molding mold (Y) placed in an injection molding machine. The injection mold (Y) was designed to mold decentered injection molding lens with a center thickness of 2.2 mm. After closing with a convex mold (Z), a polycarbonate resin (from Iupilon S-3000 Mitsubishi Engineering-Plastics Corporation) melted and kneaded to 280° C. was injected to form a thin polarizing lens of 2.2 mm in center thickness.

Hard Coat

Next, for the purpose of improving the scratch resistance of the surface, a hard coating liquid containing polyorganosilsesquioxane was applied to the entire surface of the thin polarizing lens formed by the injection molding, heated in an oven at 100° C. for 4 hours, polymerized, and cured to form a hard coating film on each of the convex and concave surfaces of the lens.

The polarizing lenses produced according to the example and the comparative example were subjected to the following evaluation tests.

Lens Weight

The lens weight (g/lens) was measured on an electronic balance. The results are shown in Table 1.

Example 1 achieved a weight reduction, which was less than 60% in specific weight from Comparative Example 1.

Drilling Performance

The polarizing lenses formed according to the examples and the comparative example were subjected to cutting into a predetermined oval shape and opening of screw holes for attachment. Then, the lenses were attached to rimless frames with dedicated screws (1.4 mm). For the measurement, the frames were attached to a measurement jig, the ends of the eyeglass temple parts were forcibly spread apart by 100 mm from the dimension without an applied force. This spreading action was repeated 500 times, and then the crack generation around the lens attachment holes was observed. The results are shown in Table 1.

No cracks were generated in the polarizing lens according to Example 1. In contrast, it was observed that many cracks were developed near the screw holes of the polarizing lens according to Comparative Example 1.

Impact Resistance

With the use of 76 φmm uncut lenses, a steel ball of 500 g was dropped to the lenses from a height of 1.27 m, and whether cracking, breaking, steel ball penetration, and the like were generated or not were evaluated. The results are shown in Table 1.

It has been confirmed that the polarizing lens according to Example 1 has sufficient impact resistance, without any crack or the like generated even in the 500 g falling-ball impact test as in Comparative Example 1 with the lens thickness of 2.2 mm.

TABLE 1

| | Material of injection-molded layer (specific gravity, g/cm³) | Lens Center Thickness mm | WEIGHT | | Drilling Performance | Impact Resistance |
| --- | --- | --- | --- | --- | --- | --- |
| | | | g/lens | Ratio to Comparative Example 1 | | |
| Example 1 | Polyamide (1.02) | 1.45 | 6.90 | 58% | no crack around drilled hole | ≥500 g |
| Comparative Example 1 | Polycarbonate (1.20) | 2.2 | 11.87 | — | Drill hole peripheral crack generation | ≥500 g |

Example 2: Preparation of Rimless Sunglasses with Polyamide Polarizing Lens (Center Thickness: 1.45 mm)

Preparation of Polarizing Sheet

An alicyclic polyamide resin (TROGAMID CX7323 from Daicel-Evonik Ltd.) was heated and then melted with a φ40-mm single screw extruder, and a sheet with a thickness of 630 µm was extruded through a T die, cooled with a chill roll, and then wound up with a winding machine. Next, the wound sheet was guided to a vertical uniaxial stretching device, and was uniaxially stretched at a stretch ratio of 2.50 while heating to a temperature (approximately from 140 to 160° C.) that is slightly higher than the glass transition temperature of the resin, to obtain polyamide sheets with a thickness of 200 µm. A polyurethane-based adhesive was coated on one side of the produced polyamide sheet to a thickness of 5 µm, and the polyamide sheets were bonded to both sides of a polyvinyl alcohol-based polarizing film with a thickness of about 40 µm, and thus a polyamide polarizing sheet with a total thickness of 450 µm was produced.

Bending of Polarizing Sheet

The polarizing sheet was cut out using a Thomson blade into two predetermined bilaterally symmetrical shapes (shapes created by making a pair of opposed edges of an approximate quadrilateral to follow an approximately arc-like outer periphery). The pair of cut-out polarizing sheets were each placed on a concave bending mold (X) of 87 mm in radius of curvature, adjusted to a temperature of 100° C., and vacuum-suctioned through a suction hole provided in the lower part of the concave mold to produce a pair of polarizing sheets with a predetermined curved shape.

Injection Molding

Next, the pair of the polarizing sheets that have been subjected to bending were each disposed on the concave surface of an injection molding mold (Y) placed in an injection molding machine. The injection mold (Y) was designed to mold decentered injection molding lens with a center thickness of 1.45 mm. After closing with a convex mold (Z), a polyamide resin composition (TROGAMID CX7323 from Daicel-Evonik Ltd.) melted and kneaded to 280° C. was injected at a pressure of 200 MPa to form a pair of thin polarizing lenses of 1.45 mm in center thickness.

Hard Coat

Next, for the purpose of improving the scratch resistance of the surface, a hard coating liquid containing polyorganosilsesquioxane was applied to the entire surface of each of the pair of the thin polarizing lenses formed by the injection molding, heated in an oven at 100° C. for 4 hours, polymerized, and cured to form a hard coating film on each of the convex and concave surfaces of the lens.

Preparation of Rimless Sunglasses

The pair of polarizing lenses (uncut lenses) obtained above were cut into rimless oval shapes (62 mm in width×40 mm in height), and mounted on a lightweight frame (weight: 3.3 g) for rimless sunglasses to prepare rimless sunglasses with the pair of two thin polarizing lenses made of polyamide with a center thickness of 1.45 mm.

Comparative Example 2: Preparation of Rimless Sunglasses with Polyamide

Polarizing Lens (Center Thickness: 2.2 mm)

Rimless sunglasses with a pair of two polarizing lenses made of polyamide with a center thickness of 2.2 mm were produced in the same manner as in Example 2 except that the pair of two polarizing lenses with a center thickness of 2.2 mm was prepared with the use of a mold designed to injection mold the decentered lens for 2.2 mm in center thickness.

Comparative Example 3: Preparation of Rimless Sunglasses with Polycarbonate Polarizing Lens (Center Thickness: 1.45 mm)

Preparation of Polarizing Sheet

The polyamide resin in Example 2 was changed to a polycarbonate resin (from Iupilon S-3000 Mitsubishi Engineering-Plastics Corporation), and a polycarbonate polarizing sheet with a total thickness of 450 µm was prepared by the same method as in Example 2.

Bending of Polarizing Sheet

From the polarizing sheet, a pair of polarizing sheets with a predetermined curved shape was prepared by the same method as in Example 2.

Injection Molding

Next, the pair of the polarizing sheets that have been subjected to bending were each disposed on the concave surface of an injection molding mold (Y) placed in an injection molding machine. The injection mold (Y) was designed to mold decentered injection molding lens with a center thickness of 1.45 mm. After closing with a convex mold (Z), a polycarbonate resin (from Iupilon S-3000 Mitsubishi Engineering-Plastics Corporation) melted and kneaded to 280° C. was injected to form a pair of thin polarizing lenses of 1.45 mm in center thickness.

Hard Coat

Next, for the purpose of improving the scratch resistance of the surface, a hard coating liquid containing polyorganosilsesquioxane was applied to the entire surface of each of the pair of the thin polarizing lenses formed by the injection molding, heated in an oven at 100° C. for 4 hours, polymerized, and cured to form a hard coating film on each of the convex and concave surfaces of the lens.

Preparation of Rimless Sunglasses

The pair of polarizing lenses (uncut lenses) obtained above were cut into rimless oval shapes (62 mm in width×40 mm in height), and mounted on a lightweight frame (weight: 3.3 g) for rimless sunglasses to prepare rimless sunglasses with the pair of two thin polarizing lenses made of polycarbonate with a center thickness of 1.45 mm.

The rimless sunglasses produced according to the example and the comparative example were subjected to the following evaluation tests.

Lens Weight

The weight (g/2 lenses) of the lens cut into rimless ball oval shapes was measured on an electronic balance. The oval shapes were all adapted to have the same projected dimensions. The results are shown in Table 2.

Total Weight

The total weight of the rimless sunglasses was measured on an electronic balance. The results are shown in Table 2.

Flexural Modulus of Injection-Molded Layer

The flexural modulus was measured in accordance with the method described in ISO178 with the use of the resin from which the injection-molded layer was formed. The results are shown in Table 2.

Forced Spreading/Closing Test

An action of forcibly spreading the temples apart at ear-side by 100 mm compared to a temple-to-temple distance when no force was applied thereto, was repeated 500 times. The damages to the lenses, the temples, and the connections thereof were evaluated.

The case without damage was evaluated as Good, whereas the case with any damage was evaluated as Poor. The results are shown in Table 2. It is to be noted that the damage was determined by the presence or absence of any permanent deformation or the presence or absence of damage.

TABLE 2

| | Polarizing Lens | | | | |
| --- | --- | --- | --- | --- | --- |
| | Center Thickness mm | Flexural Modulus of injection-molded layer MPa | Forced Spreading/Closing Test Damage | Lens Weight g/2 lenses | Total Weight g |
| Example 2 | 1.45 | 1700 | Good | 6.53 | 9.83 |
| Comparative Example 2 | 2.2 | 1700 | Poor | 9.91 | 13.21 |
| Comparative Example 3 | 1.45 | 2200 | Poor | 7.84 | 11.14 |

In Example 2, with the polyamide polarizing lenses of 1.45 mm in center thickness, the sunglasses of 10 g or smaller in total weight with a luxurious texture were prepared. In addition, favorable durability was exhibited in the forced spreading/closing test. This is believed to be because the appropriate bending of the lenses absorbed the stress during the spread, thereby reducing stress concentration on the temples, the bridge, the lenses, the joints, and the like, thus resulting in no torsion or the like.

In contrast, the sunglasses according to Comparative Example 2 with the polyamide polarizing lenses of 2.2 mm in center thickness weighed more than 10 g in total weight as a result of the thicker lenses. Moreover, in the forced spreading/closing test, the durability was rated poor. This is believed to be because, although the flexural modulus of the injection-molded layer is as relatively flexible as 1700 MPa, the lenses were excessively thick, and thus hardly capable of undergoing any bending, thereby causing distortions or stress concentration on the connections between the lenses and the temples.

The sunglasses according to Comparative Example 3 with the polycarbonate polarizing lenses with a center thickness of 1.45 mm weighed more than 10 g in total weight, thereby failing to achieve any weight reduction. Moreover, in the forced spreading/closing test, the temple connection was broken, and the lenses and the temple connection at the lens side also strongly cracked, thereby resulting in poor durability. This is believed to be because the flexural modulus of the injection-molded layer was as low as 2300 MPa and poorly flexible, thus making the lenses less likely to be bent even with the center thickness of 1.45 mm, and then failing to absorb stress.

Comparative Example 4: Preparation of Rimless Sunglasses with Polyamide Polarizing Lens (Center Thickness: 1.2 mm)

Rimless sunglasses with a pair of two thin polarizing lenses made of polyamide with a center thickness of 1.2 mm were produced in the same manner as in Example 2 except that the pair of two thin polarizing lenses with a center thickness of 1.2 mm was prepared with the use of an injection mold designed to mold decentered lens with 1.2 mm in center thickness.

The rimless sunglasses prepared according to Example 2 and Comparative Example 4 were evaluated.

Clamping Force of Temple Part

With a thread attached to both ends of the temples of the rimless sunglasses, the sunglasses were placed on a stand. With the thread hanging downward from the end of the stand, several types of weights were hung at the end of the thread. From the correlation diagram between the opening between the temple ends and the weight load, the weight required for 130 mm between temple ends was determined. It is to be noted that 130 mm is the standard distance between the temple ends when the sunglasses are worn on the face. The results are shown in Table 3.

Evaluation of Clamping Force

The rimless sunglasses were worn, and evaluated for clamping force in accordance with the following criteria. The results are shown in Table 3.

Sufficient clamping force resulting in no removal from the face . . . Good

Insufficient clamping force resulting in removal from the face . . . Poor

TABLE 3

| | Lens Thickness (mm) | Temple Opening (mm) | Clamping Force (g) | Evaluation of Clamping Force |
| --- | --- | --- | --- | --- |
| Example 2 | 1.45 | 130 | 14.5 | Good |
| Comparative Example 4 | 1.2 | 130 | 13.0 | Poor |

Figure 3:
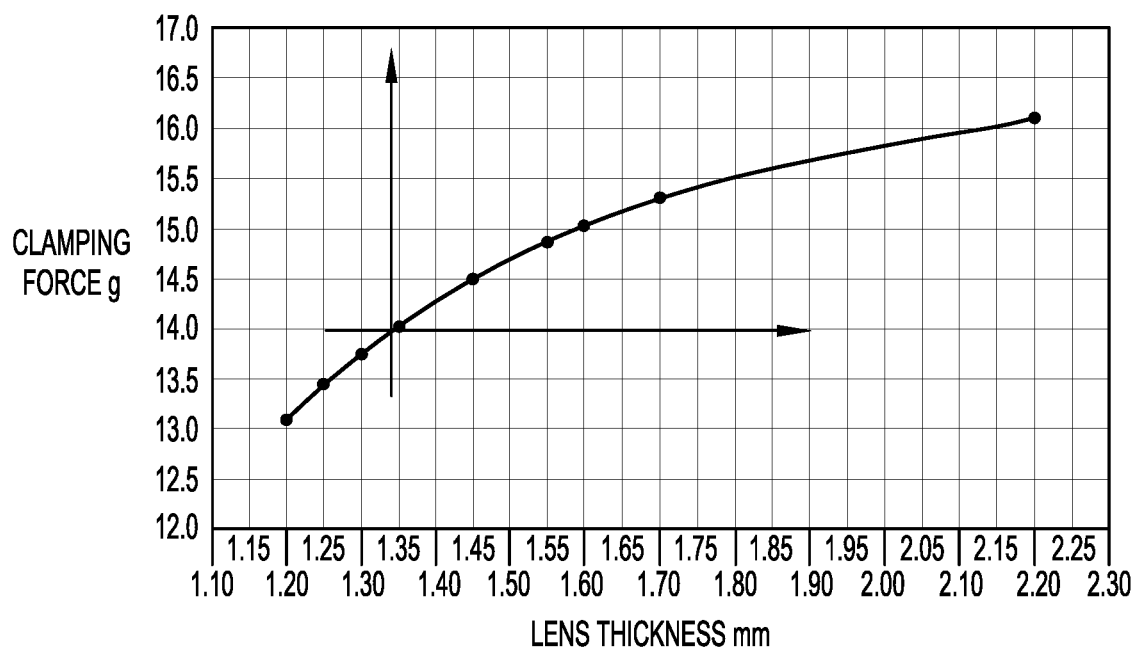
FIG. 3 is a correlation diagram showing the relationship between the thickness of a lens and the clamping force of a temple in rimless sunglasses.
Figure 4:
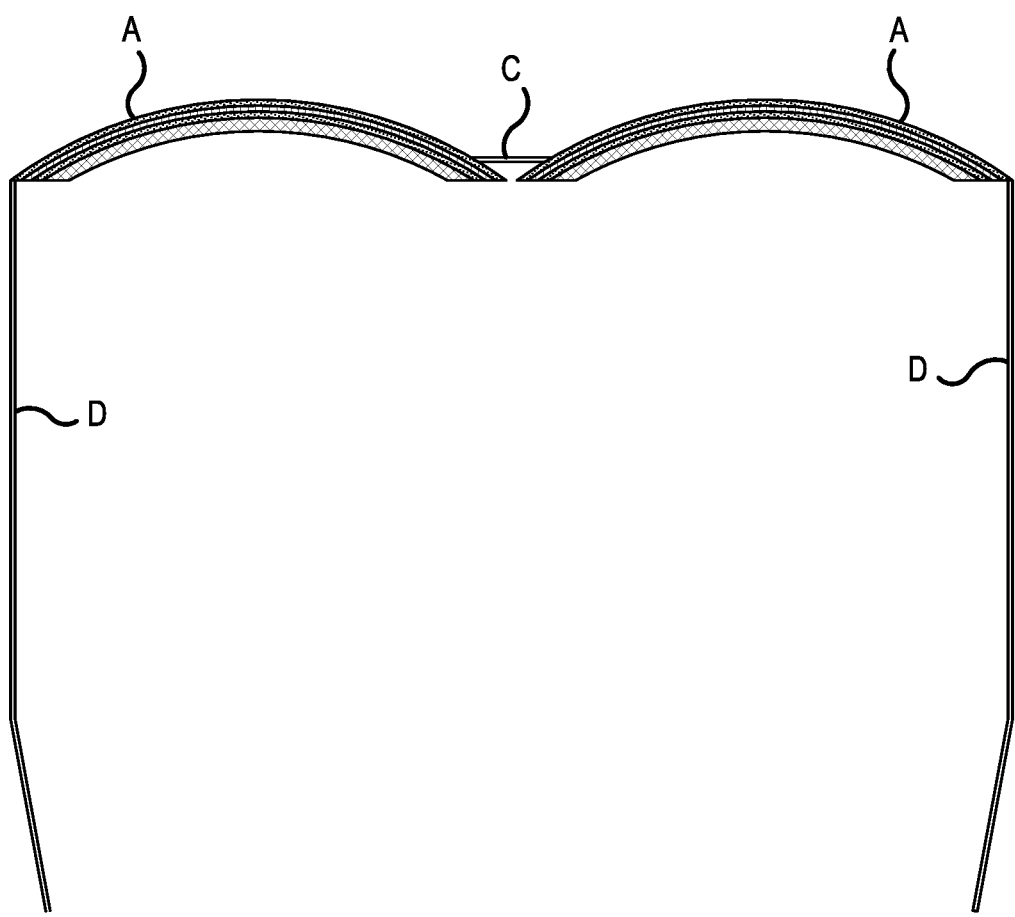
FIG. 4 is a schematic view illustrating rimless sunglasses including a pair of the polarizing lenses, a bridge, and a pair of temple parts according to an embodiment of the present invention.

From the foregoing results, a clamping force of 14 g has been believed to be required for preventing the sunglasses from falling off from the face. The relationship diagram showing the correlation between the clamping force and the lens thickness was prepared in FIG. 3. It is determined from FIG. 3 that the center thickness of the lens needs to be 1.35 mm or greater for the clamping force of 14 g or greater.

Variations of embodiments of the present invention described above are additionally described below.

[1] A polarizing lens including an injection-molded layer laminated on at least one surface of a polarizing sheet, the injection-molded layer including a polyamide-based resin, wherein:
the polarizing lens has a center thickness from 1.35 to 1.55 mm, and
the injection-molded layer has flexural modulus from 1500 to 1800 MPa.

[2] The polarizing lens according to [1], where the polarizing sheet is a laminated sheet with a protective film layer laminated on at least one surface of a polarizing film, and
the injection-molded layer is laminated on the protective film layer.

[3] The polarizing lens according to [2], where the polarizing sheet is a laminated sheet with the protective film layer laminated on both surfaces of the polarizing film.

[4] The polarizing lens according to [2] or [3], where the polarizing film is a polyvinyl alcohol-based polarizing film.

[5] The polarizing lens according to any one of [2] to [4], where the polarizing film has a thickness from 5 to 100 μm (for example, from 10 to 80 μm).

[6] The polarizing lens according to any one of [2] to [5], where the protective film layer includes at least one type of resin (for example, a polyamide-based resin) selected from the group consisting of a polyamide-based resin, a polycarbonate-based resin, and an acyl cellulose.

[7] The polarizing lens according to any one of [2] to [6], where the protective film has a thickness from 50 to 300 μm (for example, from 100 to 250 μm).

[8] The polarizing lens according to any one of [2] to [7], where the protective film is laminated to the polarizing film with an adhesive layer provided therebetween.

[9] The polarizing lens according to [8], where the adhesive layer has a thickness from 0.1 to 80 μm (for example, from 1 to 60 μm, from 2 to 50 μm, or from 5 to 40 μm) in terms of solid content.

[10] The polarizing lens according to any one of [1] to [9], where the polarizing sheet has a total thickness from 100 to 700 μm (for example, from 400 to 650 μm).

[11] The polarizing lens according to any one of [1] to [10], where the injection-molded layer has a thickness from 650 to 1300 μm.

[12] The polarizing lens according to any one of [1] to [11], where the injection-molded layer has flexural modulus of 1550 MPa or greater (for example, 1600 MPa or greater or 1650 MPa or greater).

[13] The polarizing lens according to any one of [1] to [12], where the injection-molded layer has flexural modulus of 1775 MPa or smaller (for example, 1750 MPa or smaller or 1725 MPa or smaller).

[14] The polarizing lens according to any one of [1] to [13], where the injection-molded layer has bending stress at a specified bending of 3.5% (3.5% bending stress) of 60 MPa or greater (for example, 65 MPa or greater, 70 MPa or greater, or 75 MPa or greater).

[15] The polarizing lens according to any one of [1] to [14], where the injection-molded layer has bending stress at a specified bending of 3.5% (3.5% bending stress) of 110 MPa or smaller (for example, 105 MPa or smaller, 100 MPa or smaller, or 95 MPa or smaller).

[16] The polarizing lens according to any one of [1] to [15], where the injection-molded layer has flexural strength of 100 MPa or greater (for example, 105 MPa or greater, 110 MPa or greater, or 115 MPa or greater).

[17] The polarizing lens according to any one of [1] to [16], where the injection-molded layer has flexural strength of 160 MPa or smaller (for example, 155 MPa or smaller, 150 MPa or smaller, or 145 MPa or smaller).

[18] The polarizing lens according to any one of [1] to [17], where the injection-molded layer has tensile modulus of 1300 MPa or greater (for example, 1350 MPa or greater, 1400 MPa or greater, or 1450 MPa or greater).

[19] The polarizing lens according to any one of [1] to [18], where the injection-molded layer has tensile modulus of 1700 MPa or smaller (for example, 1650 MPa or smaller, 1600 MPa or smaller, or 1550 MPa or smaller).

[20] The polarizing lens according to any one of [1] to [19], where the injection-molded layer has yield strength of 40 MPa or greater (for example, 45 MPa or greater, 50 MPa or greater, or 55 MPa or greater).

[21] The polarizing lens according to any one of [1] to [20], where the injection-molded layer has yield strength of 80 MPa or smaller (for example, 75 MPa or smaller, 70 MPa or smaller, or 65 MPa or smaller).

[22] The polarizing lens according to any one of [1] to [21], where the polyamide-based resin includes at least one selected from the group consisting of aliphatic polyamide-based resins, alicyclic polyamide-based resins, and aromatic polyamide-based resins.

[23] The polarizing lens according to [22], where the alicyclic polyamide-based resins include an alicyclic polyamide represented by the following formula (7).

[Chem. 2]

$$\left[\begin{array}{c} \underset{O}{\overset{}{C}}-(CH_2)_t-\underset{O}{\overset{}{C}}-N-\underset{}{\overset{H}{\underset{}{\bigcirc}}}-\underset{}{\overset{(R^3)_r}{\bigcirc}}-X-\underset{}{\overset{(R^4)_s}{\bigcirc}}-\underset{}{\overset{H}{N}} \end{array}\right]_u$$

where X represents a direct bond, an alkylene group, or an alkenylene group; $R^3$ and $R^4$ represent the same or different alkyl groups; r and s represent integers of 0 or from 1 to 4; t and u represent integers 1 or greater.

[24] The polarizing lens according to any one of [1] to [23], where the polyamide-based resin has a number average molecular weight from 6000 to 300000 (for example, from 10000 to 200000, or from 20000 to 200000).

[25] The polarizing lens according to any one of [1] to [24], where the polyamide-based resin has a degree of crystallinity from 1 to 20% (for example, from 1 to 10%, or from 1 to 8%).

[26] The polarizing lens according to any one of [1] to [25], where the polyamide-based resin has a heat melting temperature (Tm) from 100 to 300° C. (for example, from 110 to 280° C., or from 130 to 260° C.).

[27] The polarizing lens according to any one of [1] to [26], where the polyamide-based resin has an Abbe number of 30 or greater (for example, about from 32 to 65), (for example, 35 or greater (for example, about from 35 to 65), 40 or greater (for example, about from 40 to 60), 42 or greater (for example, about from 42 to 58), or 44 or greater (for example, about from 44 to 55)).

[28] The polarizing lens according to any one of [1] to [27], where the polyamide-based resin included in the injection-molded layer contains an alicyclic polyamide.

[29] The polarizing lens according to any one of [6] to [28], where the polyamide-based resin included in the protective film layer contains an alicyclic polyamide.

[30] The polarizing lens according to any one of [1] to [29], where the polarizing lens has a center thickness from 1.4 to 1.5 mm.

[31] The polarizing lens according to any one of [1] to [30], where the center of the polarizing lens is the geometric center of the polarizing lens.

[32] The polarizing lens of any one of [1] to [31], where the impact resistance defined below is 250 g or greater (for example, 500 g or greater).

Impact Resistance: the impact resistance is defined as a maximum value of weight (g) of steel ball that does not damage the lens when the steel ball is dropped onto the lens surface from a height of 127 cm.

[33] The polarizing lens according to any one of [1] to [32], where the polarizing lens is a decentered lens.

[34] The polarizing lens according to any one of [1] to [33], where at least one surface of the polarizing lens is subjected to at least one processing treatment selected from the group consisting of a hard coating treatment, an antireflection treatment, an anti-fogging treatment, an anti-smudge treatment, and a mirror treatment.

[35] The polarizing lens according to any one of [1] to [34], where the polarizing sheet has a protective film layer laminated on both surfaces of a polarizing film, and an injection-molded layer laminated on one of the protective films, and a hard coating layer laminated on the other protective film.

[36] The polarizing lens according to [35], where the hard coating layer is formed by applying and then curing a hard coating agent, and the hard coating agent is a polyorganosilsesquioxane-based hard coating agent.

[37] The polarizing lens according to [35] or [36], where the hard coating layer has a thickness from 1 to 20 µm (for example, from 1.5 to 6.0 µm).

[38] The polarizing lens according to any one of [1] to [37], where the polarizing lens is a lens for sunglasses.

[39] Sunglasses including the polarizing lens described in [38].

[40] The polarizing lens according to any one of [1] to [37], where the polarizing lens is a lens for rimless sunglasses.

[41] Rimless sunglasses including the polarizing lens described in [40].

[42] The rimless sunglasses according to [41], where the rimless sunglasses has a clamping force (a load required to spread the temple ends to a distance of 130 mm, when the load is applied to the both ends) of 14 g or greater (for example, 14.5 g or greater).

[43] A method for manufacturing the polarizing lens described in any one of [1] to [37], where the method includes performing thermal fusion bonding of a polyamide-based resin or a composition thereof onto at least one surface of a polarizing sheet by injection molding.

[44] The method for manufacturing the polarizing lens according to [43], where the polarizing sheet is a polarizing sheet with a protective film layer laminated on at least one surface of a polarizing film, and the method includes performing thermal fusion bonding of the polyamide-based resin or a composition thereof onto the protective film layer by injection molding.

[45] A method for manufacturing rimless sunglasses including a polarizing lens with an injection-molded layer laminated on at least one surface of a polarizing sheet, the method including:

adjusting a center thickness of the polarizing lens and flexural modulus of the injection-molded layer; and then obtaining rimless sunglasses that have a clamping force adjusted to a predetermined value, when ends of temple parts are spread apart to a distance of 130 mm.

[46] The method for manufacturing rimless sunglasses according to [45], where the injection-molded layer includes a polyamide-based resin.

[47] The method for manufacturing rimless sunglasses according to [45] or [46], where the polarizing lens has a center thickness adjusted to from 1.35 to 1.55 mm (for example, from 1.4 to 1.5 mm).

[48] The method for manufacturing rimless sunglasses according to any one of [45] to [47], where the injection-molded layer has flexural modulus adjusted to from 1500 to 1800 MPa.

[49] The method for manufacturing rimless sunglasses according to any one of [45] to [48], where the injection-molded layer has flexural modulus adjusted to 1550 MPa or greater (for example, 1600 MPa or greater or 1650 MPa or greater).

[50] The method for manufacturing rimless sunglasses according to any one of [45] to [49], where the injection-molded layer has flexural modulus adjusted to 1775 MPa or smaller (for example, 1750 MPa or smaller or 1725 MPa or greater).

[51] The method for manufacturing rimless sunglasses according to any one of [45] to [50], where the temple part has a clamping force adjusted to not less than 14 g (for example, not less than 14.5 g).

[52] The method for manufacturing rimless sunglasses according to any one of [45] to [51], where the polarizing sheet is a laminated sheet with a protective film layer laminated on at least one surface of a polarizing film, and the injection-molded layer is laminated on the protective film layer.

[53] The method for manufacturing rimless sunglasses according to any one of [45] to [52], wherein the polarizing sheet is a laminated sheet with the protective film layer laminated on both surfaces of the polarizing film.

[54] The method for manufacturing rimless sunglasses according to [52] or [53], where the polarizing film is a polyvinyl alcohol-based polarizing film.

[55] The method for manufacturing rimless sunglasses according to any one of [52] to [54], where the polarizing film has a thickness from 5 to 100 µm (for example, from 10 to 80 µm).

[56] The method for manufacturing rimless sunglasses according to any one of [52] to [55], where the protective film layer includes at least one type of resin selected from the group consisting of a polyamide-based resin, a polycarbonate-based resin, and an acyl cellulose (for example, a polyamide-based resin).

[57] The method for manufacturing rimless sunglasses according to any one of [52] to [56], where the protective film has a thickness from 50 to 300 µm (for example, from 100 to 250 µm).

[58] The method for manufacturing rimless sunglasses according to any one of [52] to [57], where the protective film is laminated to the polarizing film with an adhesive layer provided therebetween.

[59] The method for manufacturing rimless sunglasses according to [58], where the adhesive layer has a thickness from 0.1 to 80 μm (for example, from 1 to 60 μm, from 2 to 50 μm, or from 5 to 40 μm) in terms of solid content.

[60] The method for manufacturing rimless sunglasses according to any one of [45] to [59], where the polarizing sheet has a total thickness from 100 to 700 μm (for example, from 400 to 650 μm).

[61] The method for manufacturing rimless sunglasses according to any one of [45] to [60], wherein the injection-molded layer has a thickness from 650 to 1300 μm.

[62] The method for manufacturing rimless sunglasses according to any one of [45] to [61], where the injection-molded layer has bending stress at a specified bending of 3.5% (3.5% bending stress) adjusted to 60 MPa or greater (for example, 65 MPa or greater, 70 MPa or greater, or 75 MPa or greater).

[63] The method for manufacturing rimless sunglasses according to any one of [45] to [62], where the injection-molded layer has bending stress at a specified bending of 3.5% (3.5% bending stress) adjusted to 110 MPa or smaller (for example, 105 MPa or smaller, 100 MPa or smaller, or 95 MPa or smaller).

[64] The method for manufacturing rimless sunglasses according to any one of [45] to [63], where the injection-molded layer has flexural strength adjusted to 100 MPa or greater (for example, 105 MPa or greater, 110 MPa or greater, or 115 MPa or greater).

[65] The method for manufacturing rimless sunglasses according to any one of [45] to [64], where the injection-molded layer has flexural strength adjusted to 160 MPa or smaller (for example, 155 MPa or smaller, 150 MPa or smaller, or 145 MPa or smaller).

[66] The method for manufacturing rimless sunglasses according to any one of [45] to [65], where the injection-molded layer has tensile modulus adjusted to 1300 MPa or greater (for example, 1350 MPa or greater, 1400 MPa or greater, or 1450 MPa or greater).

[67] The method for manufacturing rimless sunglasses according to any one of [45] to [66], where the injection-molded layer has tensile modulus adjusted to 1700 MPa or smaller (for example, 1650 MPa or smaller, 1600 MPa or smaller, 1550 MPa or smaller).

[68] The method for manufacturing rimless sunglasses according to any one of [45] to [67], where the injection-molded layer has yield strength adjusted to 40 MPa or greater (for example, 45 MPa or greater, 50 MPa or greater, or 55 MPa or greater).

[69] The method for manufacturing rimless sunglasses according to any one of [45] to [68], where the injection-molded layer has yield strength adjusted to 80 MPa or smaller (for example, 75 MPa or smaller, 70 MPa or smaller, or 65 MPa or smaller).

[70] The method for manufacturing rimless sunglasses according to any one of [46] to [69], where the polyamide-based resin includes at least one selected from the group consisting of aliphatic polyamide-based resins, alicyclic polyamide-based resins, and aromatic polyamide-based resins.

[71] The method for manufacturing rimless sunglasses according to [70], where the alicyclic polyamide-based resin contains an alicyclic polyamide represented by Formula (7) below.

[Chem. 3]

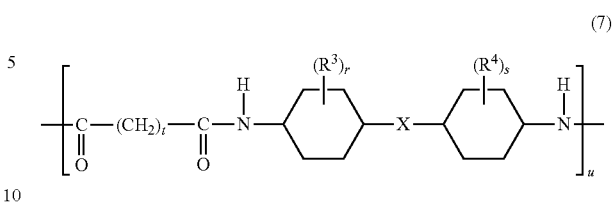

where X represents a direct bond, an alkylene group, or an alkenylene group; $R^3$ and $R^4$ represent the same or different alkyl groups; r and s represent integers of 0 or from 1 to 4; t and u represent integers 1 or greater.

[72] The method for manufacturing rimless sunglasses according to any one of [46] to [71], where the polyamide-based resin has a number average molecular weight from 6000 to 300000 (for example, from 10000 to 200000, or from 20000 to 200000).

[73] The method for manufacturing rimless sunglasses according to any one of [46] to [72], where the polyamide-based resin has a degree of crystallinity from 1 to 20% (for example, from 1 to 10%, or from 1 to 8%).

[74] The method for manufacturing rimless sunglasses according to any one of [46] to [73], where the polyamide-based resin has a heat melting temperature (Tm) from 100 to 300° C. (for example, from 110 to 280° C., or from 130 to 260° C.).

[75] The method for manufacturing rimless sunglasses according to any one of [46] to [74], where the polyamide-based resin has an Abbe number of 30 or greater (for example, about from 32 to 65), (for example, 35 or greater (for example, about from 35 to 65), 40 or greater (for example, about from 40 to 60), 42 or greater (for example, about from 42 to 58), or 44 or greater (for example, about from 44 to 55)).

[76] The method for manufacturing rimless sunglasses according to any one of [46] to [75], where the polyamide-based resin included in the injection-molded layer contains an alicyclic polyamide.

[77] The method for manufacturing rimless sunglasses according to any one of [56] to [76], where the polyamide-based resin included in the protective film layer contains an alicyclic polyamide.

[78] The method for manufacturing rimless sunglasses according to any one of [45] to [77], where the center of the polarizing lens is the geometric center of the polarizing lens.

[79] The method for manufacturing rimless sunglasses according to any one of [45] to [78], wherein the polarizing lens is a decentered lens.

[80] The method for manufacturing rimless sunglasses according to any one of [45] to [79], where at least one surface of the polarizing lens is subjected to at least one processing treatment selected from the group consisting of a hard coating treatment, an antireflection treatment, an anti-fogging treatment, an anti-smudge treatment, and a mirror treatment.

[81] The method for manufacturing rimless sunglasses according to any one of [45] to [80], where the polarizing sheet has a protective film layer laminated on both surfaces of a polarizing film, and an injection-molded layer laminated on one of the protective films, and a hard coating layer laminated on the other protective film.

[82] The method for manufacturing rimless sunglasses according to [81], where the hard coating layer is formed by applying and then curing a hard coating agent, and the hard coating agent is a polyorganosilsesquioxane-based hard coating agent.

[83] The method for manufacturing rimless sunglasses according to [81] or [82], where the hard coating layer has a thickness from 1 to 20 μm (for example, from 1.5 to 6.0 μm).

[84] The method for manufacturing rimless sunglasses according to any one of [45] to [83], where the polarizing lens has impact resistance defined below, indicating 250 g or greater (for example, 500 g or greater).

Impact Resistance: the impact resistance is defined as a maximum value of weight (g) of steel ball that does not damage the lens when the steel ball is dropped onto the lens surface from a height of 127 cm.

INDUSTRIAL APPLICABILITY

The polarizing lens according to the invention is useful as a thin and lightweight lens for sunglasses, goggles, and the like, in particular, a lens for rimless sunglasses.

REFERENCE SIGNS LIST

1 Polarizing film
2a, 2b Protective film layer
3 Injection-molded layer
A Polarizing lens
B Polarizing sheet
C: Bridge
D: Temple parts
a Central axis
v Lens center thickness
X Mold for bending
Y, Z Mold for injection molding
P Intake hole
Q Injection hole

The invention claimed is:

1. Rimless sunglasses comprising:
a pair of polarizing lenses, each of the polarizing lenses comprising an injection-molded layer laminated on at least one surface of a polarizing sheet, the injection-molded layer including a polyamide-based resin;
a bridge connecting the pair of polarizing lenses; and
a pair of temple parts, each of which is connected to the polarizing lens,
wherein each of the polarizing lenses has a center thickness from 1.35 to 1.5 mm,
wherein the injection-molded layer has flexural modulus from 1500 to 1800 MPa,
wherein the polarizing sheet is a laminated sheet comprising a polarizing film and protective film layers laminated on both surfaces of the polarizing film,
wherein the injection-molded layer is laminated on one of the protective film layers, and
wherein the pair of polarizing lenses, the bridge, and the pair of temple parts, in combination with the center thickness and the flexural modulus, are configured so that the rimless sunglasses has a clamping force of 137.3 mN to about 144 mN when ends of the temple parts are spread apart to a distance of 130 mm.

2. The rimless sunglasses according to claim 1, wherein each of the protective film layers includes at least one type of resin selected from the group consisting of a polyamide-based resin, a polycarbonate-based resin, and an acyl cellulose.

3. The rimless sunglasses according to claim 2, wherein the polyamide-based resin included in the protective film layer contains an alicyclic polyamide.

4. The rimless sunglasses according to claim 1, wherein the polyamide-based resin included in the injection-molded layer contains an alicyclic polyamide.

5. The rimless sunglasses according to claim 1, wherein at least one surface of the polarizing lenses is subjected to at least one processing treatment selected from the group consisting of a hard coating treatment, an antireflection treatment, an anti-fogging treatment, an anti-smudge treatment, and a mirror treatment.

6. A method for manufacturing the rimless sunglasses according to claim 1, the method comprising:
adjusting the center thickness of each of the polarizing lenses to from 1.35 to 1.5 mm and the flexural modulus of the injection-molded layer of each of the polarizing lenses to from 1500 to 1800 MPa; and
configuring the pair of polarizing lenses, the bridge, and the pair of temple parts, in combination with the center thickness and the flexural modulus, so that the rimless sunglasses have the clamping force of 137.3 mN to about 144 mN when the ends of the temple parts are spread apart to the distance of 130 mm.

7. The manufacturing method according to claim 6, wherein the protective film layer of each of the polarizing lenses comprises at least one type of resin selected from the group consisting of a polyamide-based resin, a polycarbonate-based resin, and an acyl cellulose.

8. The manufacturing method according to claim 7, wherein the polyamide-based resin included in the protective film layer of each of the polarizing lenses comprises an alicyclic polyamide.

9. The manufacturing method according to claim 6, wherein the polyamide-based resin included in the injection-molded layer of each of the polarizing lenses comprises an alicyclic polyamide.

10. The manufacturing method according to claim 6, further comprising: subjecting at least one surface of each of the polarizing lenses to at least one processing treatment selected from the group consisting of a hard coating treatment, an antireflection treatment, an anti-fogging treatment, an anti-smudge treatment, and a mirror treatment.

11. The rimless sunglasses according to claim 1, the rimless sunglasses having a total mass of 9.83 g to 10 g.

* * * * *